United States Patent
Mehta et al.

(10) Patent No.: US 12,475,176 B2
(45) Date of Patent: Nov. 18, 2025

(54) AUTOMATED SYSTEM AND METHOD FOR CREATING STRUCTURED DATA OBJECTS FOR A MEDIA-BASED ELECTRONIC DOCUMENT

(71) Applicants: Jatin V. Mehta, Voorhees, NJ (US); Stephen Joslyn Myers, Bear, DE (US)

(72) Inventors: Jatin V. Mehta, Voorhees, NJ (US); Stephen Joslyn Myers, Bear, DE (US)

( * ) Notice: Subject to any disclaimer, the term of this patent is extended or adjusted under 35 U.S.C. 154(b) by 46 days.

(21) Appl. No.: 17/692,197

(22) Filed: Mar. 11, 2022

(65) Prior Publication Data
US 2022/0292160 A1    Sep. 15, 2022

Related U.S. Application Data

(60) Provisional application No. 63/177,436, filed on Apr. 21, 2021, provisional application No. 63/159,504, filed on Mar. 11, 2021.

(51) Int. Cl.
G06F 16/951 (2019.01)
G06F 40/58 (2020.01)

(52) U.S. Cl.
CPC .......... *G06F 16/951* (2019.01); *G06F 40/58* (2020.01)

(58) Field of Classification Search
None
See application file for complete search history.

(56) References Cited

U.S. PATENT DOCUMENTS

| | | | |
|---|---|---|---|
| 7,321,852 B2 * | 1/2008 | Stanford | G10L 15/26 704/277 |
| 8,594,994 B1 * | 11/2013 | Dean | G06F 40/58 704/7 |
| 8,996,369 B2 * | 3/2015 | Stanford | G10L 15/26 704/277 |
| 9,058,375 B2 * | 6/2015 | Rosen | G06F 16/7867 |
| 9,098,488 B2 * | 8/2015 | Hamid | G06F 40/58 |

(Continued)

OTHER PUBLICATIONS

Yang, Haojin et al. "Content Based Lecture Video Retrieval Using Speech and Video Text Information", 2014 IEEE. <https://doi.org/10.1109/CCNC.2009.4784882> (Year: 2014).*

*Primary Examiner* — Tamara T Kyle
*Assistant Examiner* — Tyler Schallhorn
(74) *Attorney, Agent, or Firm* — Ashok Tankha

(57) ABSTRACT

A system including a media data optimization engine (MDOE) and a method for automatically creating structured data objects for media content rendered in one or more languages in an electronic document of a business entity are provided. The MDOE identifies non-textual objects including media content rendered in one or more languages in the electronic document and generates textual objects in the corresponding language(s) therefrom. The MDOE transforms the textual objects into structured data objects based on configurable criteria and generates a dynamic index-oriented object for the structured data objects specific to the business entity. The MDOE connects the structured data objects to the dynamic index-oriented object by creating linked data nodes therefrom with the dynamic index-oriented object as a core. The MDOE connects the dynamic index-oriented object with the linked data nodes to the electronic document, thereby facilitating dynamic changes to the electronic document and dynamically optimizing the electronic document.

19 Claims, 10 Drawing Sheets

(56) References Cited

U.S. PATENT DOCUMENTS

| | | | |
|---|---|---|---|
| 9,230,547 B2* | 1/2016 | Wilder | G10L 15/25 |
| 9,477,656 B1* | 10/2016 | Dean | G06F 40/58 |
| 9,519,642 B2* | 12/2016 | Johnson, III | G06F 40/58 |
| 9,990,422 B2* | 6/2018 | Chang | G06F 16/35 |
| 10,552,548 B2* | 2/2020 | Ruvini | G06F 40/58 |
| 10,698,960 B2* | 6/2020 | Mehta | G06F 16/212 |
| 10,803,045 B2* | 10/2020 | Raghavan | G06F 40/177 |
| 11,373,048 B2* | 6/2022 | Liu | G06F 40/55 |
| 12,038,900 B2* | 7/2024 | Raghavan | G06F 3/04847 |
| 2005/0091274 A1* | 4/2005 | Stanford | G06F 16/9577 |
| 2008/0005175 A1* | 1/2008 | Bourke | G06F 16/41 |
| 2008/0052062 A1* | 2/2008 | Stanford | G10L 15/26 |
| | | | 704/E15.045 |
| 2009/0006342 A1* | 1/2009 | Wong | G06F 16/3337 |
| 2011/0196854 A1* | 8/2011 | Sarkar | G06F 16/9535 |
| | | | 707/E17.108 |
| 2011/0218994 A1* | 9/2011 | Holladay | G06F 16/7844 |
| | | | 707/E17.054 |
| 2012/0253785 A1* | 10/2012 | Hamid | G06F 40/263 |
| | | | 704/4 |
| 2012/0310955 A1* | 12/2012 | Uszkoreit | G06Q 30/0277 |
| | | | 707/754 |
| 2014/0222413 A1* | 8/2014 | Rossmann | G06F 3/0488 |
| | | | 704/3 |
| 2014/0244236 A1* | 8/2014 | Johnson, III | G06F 9/454 |
| | | | 704/2 |
| 2015/0019206 A1* | 1/2015 | Wilder | G06V 40/174 |
| | | | 704/235 |
| 2015/0100578 A1* | 4/2015 | Rosen | G06F 16/907 |
| | | | 707/737 |
| 2015/0106078 A1* | 4/2015 | Chang | G06F 16/35 |
| | | | 704/9 |
| 2015/0255066 A1* | 9/2015 | Wilder | G06V 20/70 |
| | | | 704/235 |
| 2015/0269236 A1* | 9/2015 | Rosen | G16H 40/67 |
| | | | 707/602 |
| 2016/0179831 A1* | 6/2016 | Gruber | G10L 19/018 |
| | | | 704/235 |
| 2017/0068663 A1* | 3/2017 | Johnson, III | G06F 40/58 |
| 2017/0154101 A1* | 6/2017 | Raghavan | G06F 40/58 |
| 2018/0132011 A1* | 5/2018 | Shichman | H04N 21/233 |
| 2018/0165364 A1* | 6/2018 | Mehta | G06F 9/54 |
| 2018/0253421 A1* | 9/2018 | Ruvini | G06Q 30/0601 |
| 2020/0394173 A1* | 12/2020 | Raghavan | G06F 16/211 |
| 2021/0073341 A1* | 3/2021 | Liu | G06F 16/9535 |
| 2024/0248887 A9* | 7/2024 | Raghavan | G06F 40/177 |

* cited by examiner https://www.metasenseusa.com

Thanks For Your Payment

Business Entity Optimized Code Has Been Successfully Generated

Please copy below Optimized Script and paste it into your end of the webpages.

```
<script src="https://metasensemarketing.com/imetadextool/schema/imetadex_1629101304.js"></script>
```

FIG. 6D

AUTOMATED SYSTEM AND METHOD FOR CREATING STRUCTURED DATA OBJECTS FOR A MEDIA-BASED ELECTRONIC DOCUMENT

CROSS-REFERENCE TO RELATED APPLICATIONS

This application claims priority to and the benefit of the provisional patent application titled "A System And Method For Creating Structured Data Objects For A Website With Text/Video/Audio/Animation Content In Any Combination", application No. 63/177,436, filed in the United States Patent and Trademark Office (USPTO) on Apr. 21, 2021, the provisional patent application titled "A Method Of Dynamic Data Manipulation Of A Business Website Using An Omega Object", application No. 63/159,504, filed in the USPTO on Mar. 11, 2021, and the non-provisional patent application titled "Dynamic Website Characterization for Search Optimization", application Ser. No. 17/692,061, filed in the USPTO on Mar. 10, 2022. The specifications of the above referenced patent applications are incorporated herein by reference in their entirety.

BACKGROUND

Businesses have an increasing need to improve the quality and quantity of web traffic to their websites. A substantial percentage of web traffic is generated through the use of search engines. Increasing web traffic to obtain desired exposure to a website depends on several factors, for example, appropriate selection and inclusion of keywords on webpages, number and frequency of relevant keywords, crawlability and indexability of the webpages, ranking factors defined by search engines, on-page optimization, off-page optimization, onsite optimization, etc. A search engine collects, parses, indexes, and stores data to facilitate convenient and fast access and retrieval of content from websites. Search engine optimization is a process of enhancing visibility of a website in results provided by a search engine to maximize the number of visitors viewing the website. Search engine optimization ensures that the website has a high ranking and appears high on a list of search engine results. Optimization of a business' website, for example, increases brand awareness, generates leads, attracts customers, develops the business' credibility, etc. Some factors that optimize a business' website comprise, for example, inserting right metatags and headings in webpages, ensuring crawlability of the webpages, increasing comprehensibility of the webpages, internal linking, backlinks, deploying schema markup, etc. Deploying schema markup in the webpages of the website provides a search engine optimization boost to the website.

An online collaborative organization such as schema.org sponsored by Google LLC, Microsoft Corporation, Yahoo! Inc., and Yandex, Ltd., creates, maintains, and promotes schemas for structured data on the Internet and in electronic documents, for example, webpages. Structured data is data in a standardized format configured to provide information about a webpage and classify the content of the webpage. Structured data conforms to a predefined data model and has a well-defined, easily identifiable, and decipherable structure. Search engines access and utilize structured data to interpret the content of a webpage. Structured data is typically stored in well-defined schemas. Schema.org provides a comprehensive list of specific categories that are used for developing schema codes for websites and for indexing websites for enhancing their rankings, driving traffic, and increasing awareness in search engines. The schema.org vocabularies are configured to be used with many different encodings, for example, the Resource Description Framework in Attributes (RDFa), Microdata, and JavaScript Object Notation for Linked Data (JSON-LD). These vocabularies cover entities and relationships between entities and actions, and can be extended through a well-documented extension model. Many applications, for example, from Google LLC, Microsoft Corporation, Pinterest, Inc., Yandex, Ltd., etc., use the schema.org vocabularies to power rich, extensible experiences. Google LLC and schema.org collaboratively provide the schema vocabularies and schema markups to improve indexing of a website.

While schema.org and structured data are supported by multiple search engines, for example, the Google® search engine of Google LLC, the Bing® search engine of Microsoft Corporation, the Yahoo® search engine of Yahoo! Inc., the Yandex® search engine of Yandex, Ltd., etc., to help websites get indexed in a more organized and efficient manner, multiple websites still do not use schema codes to markup website content. While approximately only 15% of websites searched comprise schema markups, these websites use schema codes for specific content such as recipes or movie reviews. While structured data of websites is open and available for use, the usage of the schema codes is either inadequate or there is no system that makes use of the schema codes. Schema.org-approved search engine optimization algorithms use snippets of content of a website and may ignore critical indicators related to a business that optimize the website. While some conventional algorithms generate structured data for textual data of a webpage, there is a need for generating, analyzing, and harnessing structured data for media content of different types and combinations, for example, images, audio content, video content, animations, audiovisual content, multimedia content, etc., on webpages, optimally to enhance search engine optimization of websites. Furthermore, there is a need for generating, analyzing, and harnessing structured data for multilanguage media content of different types and combinations on webpages, optimally to enhance search engine optimization of multilanguage websites.

Hence, there is a long-felt need for an automated system and a method for automatically creating structured data objects for media content of different types and combinations rendered in one or more of multiple languages in a media-based electronic document, for example, a website, a webpage of a website, etc., of a business entity, and dynamically optimizing the media-based electronic document for enhanced indexation by search engines and improved listings in search results. Moreover, there is a need for an automated system and a method for targeting schema codes that are most relevant to businesses and their websites to enhance the businesses, the websites of the businesses, and the indexation of relevant media content of different types and combinations rendered in one or more of multiple languages, and to maximize web traffic potential. Furthermore, there is a need for an automated system and a method for adding relevant content to a website of a business entity that drives web traffic to the business entity's website and pushing that content out to the internet.

SUMMARY

This summary is provided to introduce a selection of concepts in a simplified form that are further disclosed in the detailed description. This summary is not intended to determine the scope of the claimed subject matter.

The automated system and the method disclosed herein address the above-recited need for automatically creating structured data objects for media content of different types and combinations rendered in one or more of multiple languages in a media-based electronic document, for example, a website, a webpage of a website, etc., of a business entity, and dynamically optimizing the media-based electronic document for enhanced indexation by search engines and improved listings in search results. The automated system and the method disclosed herein provide a set of guidelines to identify what to code, where to code, how to code, and how to ensure the code works on the website of the business entity to improve its indexation by search engines and its listings in search results. The automated system and the method disclosed herein add coding to a website that assists search engines to index the business entity's website faster, better, and under the business entity's control. Moreover, the automated system and the method disclosed herein address the above-recited need for targeting schema codes that are most relevant to businesses and their websites to enhance the businesses, the websites of the businesses, and the indexation of relevant media content of different types and combinations rendered in one or more of multiple languages, and to maximize web traffic potential. Furthermore, the automated system and the method disclosed herein address the above-recited need for adding relevant content to a website of a business entity that drives web traffic to the business entity's website and pushes that content out to the internet. Furthermore, the automated system and the method disclosed herein generate, analyze, and harness structured data for multilanguage media content of different types and combinations on webpages, optimally to enhance search engine optimization of multilanguage websites.

The automated system and the method disclosed herein employ a media data optimization engine (MDOE) defining computer program instructions executable by at least one processor for automatically creating structured data objects for media content rendered in one or more of multiple languages in an electronic document of a business entity and dynamically optimizing the electronic document. The electronic document is, for example, a website, a webpage of a website, etc. The electronic document comprises textual objects and the non-textual objects in one or more of multiple languages, for example, natural languages such as English, Mandarin, Hindi, French, German, Spanish, Italian, Turkish, etc. The non-textual objects comprise, for example, image objects, audio objects, video objects, animation objects, multimedia objects, etc., and any combination thereof. The MDOE accesses the electronic document using an identifier, for example, a uniform resource locator (URL) of the electronic document. The MDOE identifies non-textual objects comprising media content rendered in one or more of multiple languages in the electronic document.

The media data optimization engine (MDOE) generates textual objects in the corresponding language(s) from the identified non-textual objects. In an embodiment, the MDOE generates the textual objects in the corresponding language(s) from the identified non-textual objects as follows. The MDOE searches for objects in the electronic document for identifying the non-textual objects in their corresponding language(s). The MDOE categorizes the identified non-textual objects into media categories. The media categories comprise, for example, an image category, an audio category, a video category, an animation category, a multimedia category, etc., and any combination thereof. The MDOE analyzes the identified non-textual objects in each of the media categories based on characteristics of the identified non-textual objects. The MDOE generates transcripts and/or closed captions (CCs) in the corresponding language(s) for the identified non-textual objects in the media categories. The MDOE translates the transcripts and/or the closed captions of the identified non-textual objects in the media categories into the textual objects in the corresponding language(s). The MDOE analyzes the textual objects in the corresponding language(s) with market data specific to the business entity for optimizing and increasing accuracy of the textual objects in the corresponding language(s). The market data for optimizing the textual objects comprise, for example, geographical data, local data, image data, keyword search data, etc., and any combination thereof.

The media data optimization engine (MDOE) transforms the generated textual objects in the corresponding language(s) into structured data objects based on configurable criteria. The configurable criteria comprise, for example, templates, content derived from the electronic document, content derived from the generated textual objects in the corresponding language(s), structured data markup schemas, best practices associated with schemas to suit multiple linked data object categories, etc., and any combination thereof. In an embodiment, in addition to the non-textual objects, the MDOE transforms textual objects found in the electronic document during a search for objects in the electronic document into structured data objects based on the configurable criteria. In an embodiment, the MDOE creates the structured data objects using an artificial intelligence (AI)-based transformation of the generated textual objects in the corresponding language(s).

The media data optimization engine (MDOE) generates a dynamic index-oriented object for the structured data objects specific to the business entity. In an embodiment, the MDOE stores the structured data objects in a dynamic index-oriented object database. The MDOE connects the structured data objects to the dynamic index-oriented object by creating linked data nodes from the structured data objects with the dynamic index-oriented object as a core. In an embodiment, the linked data nodes of the dynamic index-oriented object are JavaScript Object Notation for Linked Data (JSON-LD) nodes. In another embodiment, the linked data nodes of the dynamic index-oriented object are Microdata nodes. In another embodiment, the linked data nodes of the dynamic index-oriented object are Resource Description Framework in Attributes (RDFa) nodes. The MDOE connects the dynamic index-oriented object with the linked data nodes to the electronic document, thereby facilitating dynamic changes to the electronic document and dynamically optimizing the electronic document. The MDOE connects the dynamic index-oriented object with the linked data nodes to the electronic document, for example, using an application programming interface (API) key. In an embodiment, the dynamic changes to the electronic document are facilitated free of recreation of the structured data objects using the created linked data nodes of the dynamic index-oriented object. In an embodiment, in response to a search query, the MDOE fits one or more of the linked data nodes of the dynamic index-oriented object to the search query.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific components, modules, and methods disclosed herein. The description of a component, or a module, or a method step referenced by a numeral in a drawing is applicable to the description of that component, or that module, or that method step shown by that same numeral in any subsequent drawing herein.

FIGS. 6A-6E exemplarily illustrate screenshots of graphical user interfaces rendered by the media data optimization engine for automatically creating structured data objects for media content rendered in one or more of multiple languages in an electronic document of a business entity and dynamically optimizing the electronic document.

DETAILED DESCRIPTION

Various aspects of the disclosure herein are embodied as a system, a method, or a non-transitory, computer-readable storage medium having one or more computer-readable program codes stored thereon. Accordingly, various embodiments of the disclosure herein take the form of an entirely hardware embodiment, an entirely software embodiment comprising, for example, microcode, firmware, software, etc., or an embodiment combining software and hardware aspects that are referred to herein as a "system", a "module", an "engine", a "circuit", or a "unit".

Figure 1:
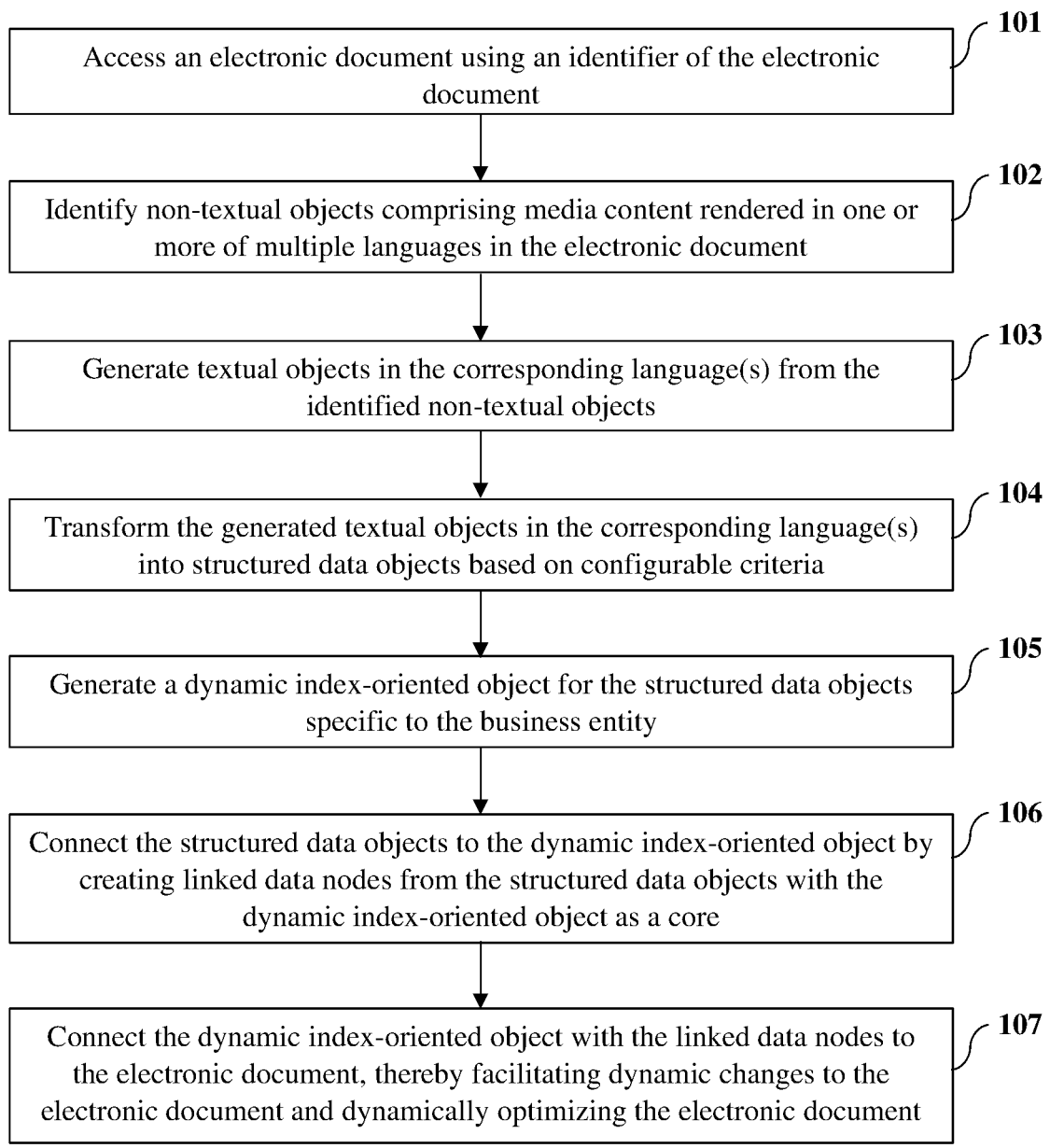
FIG. 1 illustrates a flowchart of an embodiment of a method for automatically creating structured data objects for media content rendered in one or more of multiple languages in an electronic document of a business entity and dynamically optimizing the electronic document.

FIG. 1 illustrates a flowchart of an embodiment of a method for automatically creating structured data objects for media content rendered in one or more of multiple languages in an electronic document of a business entity and dynamically optimizing the electronic document. As used herein, "structured data object" refers to a data structure or a container constructed as an aggregate of data elements, for example, data values that are stored and retrievable, relationships between the data values, and functions that operate on the data values. Also, as used herein, "electronic document" refers to a collection of data and content comprising, for example, textual content, image content, audio content, video content, audiovisual content, animations, multimedia content, etc., and any combination thereof, in an electronic format. The electronic document is, for example, a website such as a business website, a webpage of a website such as a personal page, a sports team page, an electronic commerce (ecommerce) webpage, a news page, etc. For purposes of illustration, the disclosure herein refers to the electronic document being a website or a webpage of a website; however, the scope of the automated system and the method disclosed herein is not limited to the electronic document being a website or a webpage of a website, but extends to include other electronic documents, for example, electronic mail (email), messages, and other functionally equivalent structures that require automatic creation of structured data objects and dynamic optimization.

The method disclosed herein employs a media data optimization engine (MDOE) defining computer program instructions executable by at least one processor for automatically creating structured data objects for media content rendered in one or more of multiple languages in an electronic document of a business entity and dynamically optimizing the electronic document. The MDOE processes a media-based electronic document comprising media content, for example, image content, video content, audio content, audiovisual content, animation content, multimedia content, etc., and any combination thereof, in addition to textual content, for automatically creating structured data objects for the media content rendered in one or more of multiple languages in the media-based electronic document and dynamically optimizing the media-based electronic document. In an embodiment, the media-based electronic document is an electronic document comprising media content and textual content in a single language, for example, any one natural language such as English, Mandarin, Hindi, French, German, Spanish, Italian, Turkish, etc. In another embodiment, the media-based electronic document is a multilanguage electronic document comprising media content and textual content in two or more languages, for example, natural languages such as English, Mandarin, Hindi, French, German, Spanish, Italian, Turkish, etc. The electronic document comprises textual objects and the non-textual objects in one or more of multiple languages. As used herein, "textual objects" refer to data objects comprising textual content of an element or an attribute, defined by character strings comprising, for example, letters, numerical characters, special characters, etc., rendered in one or more languages. The textual content comprises, for example, individual characters, words, sentences, paragraphs, etc., rendered in one or more languages in the electronic document. Also, as used herein, "non-textual objects" refer to data objects comprising non-textual content, for example, graphics, icons, still images, moving images, sounds, and other forms of visual, audible, and tactile content that is rendered in lieu of or to complement textual content in an electronic document. The non-textual objects comprise, for example, image objects, audio objects, video objects, animation objects, multimedia objects, etc., and any combination thereof. The non-textual objects, for example, audio objects, video objects, and multimedia objects are rendered in one or more languages in the electronic document.

In an embodiment, the media data optimization engine (MDOE) is implemented as a web-based platform hosted on a server or a network of servers accessible via a network, for example, the internet, satellite internet, a wireless network, a mobile telecommunication network, etc. In another embodiment, the MDOE is implemented in a cloud computing environment. As used herein, "cloud computing environment" refers to a processing environment comprising configurable computing physical and logical resources, for example, networks, servers, storage media, virtual machines, applications, services, etc., and data distributed over a network. The cloud computing environment provides an on-demand network access to a shared pool of the configurable computing physical and logical resources. In another embodiment, the MDOE comprises a software application downloadable and usable on a user device, for example, a personal computer, a tablet computing device, a mobile computer, a mobile phone, a smartphone, a laptop, a wearable device such as smart glasses, smart watches, etc., a client device, a network-enabled computing device, etc., and configured to perform functions of the MDOE.

In the method disclosed herein, the media data optimization engine (MDOE) accesses 101 the electronic document using an identifier, for example, a uniform resource locator (URL) of the electronic document. The input data, for example, the URL inputted via a user interface, for example, a graphical user interface (GUI), a command-line interface, etc., rendered by the MDOE, is transformed, processed, and executed by a heuristically-based coded algorithm in the MDOE for automatically creating structured data objects for the media content rendered in one or more of multiple languages in the electronic document of the business entity and dynamically optimizing the electronic document. In an embodiment, the URL of the website is transformed by the heuristically-based coded algorithm as follows: The MDOE receives the URL and generates a robot.txt file that instructs a web crawler to crawl the electronic document and content related to the electronic document from one or a combination of one or more search engines and/or media platforms. The MDOE utilizes the instructions provided by the robot.txt file to allow the web crawler to visit the URL and collect the available media content at the visited URL. The MDOE implements application programming interface (API) key integration to access search engines and media platforms to collect the content related to the visited URL. The MDOE receives the media content, for example, the audio content, the video content, the audiovisual content, the animation content, the multimedia content, etc., in any combination. The MDOE combines the media content together into a document and compares the media content to functions of the heuristically-based coded algorithm for coding, automatic creation of structured data objects, and dynamic optimization of the electronic document, thereby transforming the received URL into an optimally coded electronic document. As used herein, "coding" refers to applying schema codes to relevant media content in an electronic document. The MDOE applies schema codes to media content and other relevant content in an electronic document using different encodings, for example, a JavaScript Object Notation for Linked Data (JSON-LD) encoding, a Resource Description Framework in Attributes (RDFa) encoding, a Microdata encoding, etc.

The schema codes comprise structured data tags in a markup language code, for example, a hypertext markup language (HTML) code, a JavaScript Object Notation (JSON) code, an extensible markup language (XML) code, an extensible hypertext markup language (XHTML) code, etc. As used herein, "structured data tags" refer to on-page markup that allows search engines to understand the media content of the electronic document and use the media content to improve a search result listing. The structured data pairs a name with a value. The structured data tags are, for example, markup language tags such as HTML tags, JavaScript Object Notation for Linked Data (JSON-LD) tags, etc., that can be added to an electronic document, for example, a website, to allow the search engines to categorize and index the content of the electronic document optimally. In various embodiments, the method disclosed herein utilizes artificial intelligence, machine learning, a big data architecture framework, a geographic information system (GIS) framework, and different technology tools comprising, for example, the IBM Watson® cognitive technology tool of International Business Machines Corporation (IBM Corp) for coding media content and other content of an electronic document for search engine optimization through the automatic creation of structured data objects and dynamic optimization of the electronic document.

In an embodiment, the media data optimization engine (MDOE) executes the heuristically-based coded algorithm as a search engine optimization (SEO) algorithm for optimizing the electronic document and facilitating and improving search engine indexing of the electronic document. The heuristically-based coded algorithm implements a step change for improving traffic to the electronic document. In an embodiment, the MDOE provides an SEO tool that optimizes the electronic document through a cloud-based software as a service (CSaaS) platform. The MDOE facilitates a high ranking of the electronic document on a search engine results page and drives brand recognition, website visits, and sales. The MDOE executes the heuristically-based coded algorithm along with the cloud-based SaaS model to improve the effectiveness of the electronic document. The MDOE provides the heuristically-based coded algorithm along with the cloud-based SaaS model to all small and medium sized enterprises (SMEs) and improves the SEO market.

Furthermore, in the method disclosed herein, the media data optimization engine (MDOE) identifies 102 non-textual objects comprising media content rendered in one or more of multiple languages in the electronic document. The MDOE performs data scraping on the electronic document and identifies tags related to the non-textual objects as disclosed in the descriptions of FIG. 3 and FIG. 5. The MDOE generates 103 textual objects in the corresponding language(s) from the identified non-textual objects as disclosed in the description of FIG. 2. In an embodiment, the MDOE stores the generated textual objects in a text file for further processing and analysis. The MDOE transforms 104 the generated textual objects in the corresponding language(s) into structured data objects based on configurable criteria. The configurable criteria comprise, for example, templates, content derived from the electronic document, content derived from the generated textual objects in the corresponding language(s), structured data markup schemas, best practices associated with schemas to suit multiple linked data object categories, etc., and any combination thereof. In an example, the MDOE, in operable communication with a collaborative schema data source that maintains multiple schema codes for non-textual objects, transforms the generated textual objects into structured data objects. As used herein, "collaborative schema data source" refers to a data source that collaboratively collects and maintains multiple schema codes that improve search engine optimization of an electronic document, for example, a website. An example of a collaborative schema data source is schema.org sponsored by Google LLC, Microsoft Corporation, Yahoo! Inc., and Yandex, Ltd. Although the detailed description refers to "schema.org" being used as the collaborative schema data source, the scope of the automated system and the method disclosed herein is not limited to "schema.org" being used as the collaborative schema data source, but extends to include any other collaborative schema data source that collaboratively collects and maintains multiple schema codes that can be used for search engine optimization of an electronic document.

In an example, the media data optimization engine (MDOE) analyzes the text file containing the generated textual objects and creates structured data objects using templates, textual content, content from the text file, and best practices from schema.org to suit multiple JavaScript Object Notation for Linked Data (JSON-LD) object categories. The MDOE transforms the textual objects in the corresponding language(s) into structured data objects by coding the textual objects with optimal schema codes as disclosed in Applicant's patent titled "Content Validation and Coding for Search Engine Optimization" with application Ser. No. 15/834,228, issued as U.S. Pat. No. 10,698,960, which is incorporated herein by reference in its entirety. As used herein, "optimal schema codes" refer to schema codes or code snippets that the MDOE determines are relevant for automatic creation of the structured data objects. The structured data objects comprise coding that assists search engines in indexing the electronic document, for example, a website, fast and optimally displaying website listings in the results of the search engines. In an embodiment, the structured data objects are configured, for example, with hypertext markup language (HTML) markups or JavaScript Object Notation (JSON) markups that can be integrated into the electronic document for coding the electronic document. The structured data objects align with a format of a database that follows rules and structure to allow the search engines to scan the electronic document quickly and effectively. In an embodiment, in addition to the non-textual objects, the MDOE transforms textual objects found in the electronic document during a search for objects in the electronic document into structured data objects based on the configurable criteria disclosed above. In an embodiment, the MDOE creates the structured data objects using an artificial intelligence (AI)-based transformation of the generated textual objects in the corresponding language(s). In another embodiment, the MDOE implements blockchain technology and protocols that utilize JSON-LD for executing the various analyses disclosed above and below in a secure, shared, and decentralized environment, and thereafter connecting the created structured data objects to a multidimensional object herein referred to as a dynamic index-oriented object.

An example schema code applied to content of a website of a business entity using a JavaScript Object Notation for Linked Data (JSON-LD) encoding in a hypertext markup language (HTML) script tag, thereby generating a structure data object for the content, is disclosed below.

```
<script type="application/ld+json">
{
  "@context": "http://schema.org",
  "@type": "LocalBusiness",
  "address": { "@type": "PostalAddress",
    "addressLocality": "US", "addressRegion": "NJ", "streetAddress": "403 Commerce Lane, Suite 5, West Berlin, NJ 08091" },
  "description": "Is a Full-Service Digital Marketing Agency that takes pride in creating Successful, Comprehensive Marketing Plans and is the only company in the world to offer the patented iMetaDex ™ tool.",
  "telephone": "8562034548",
  "priceRange": "Contact For Price",
  "image": ["https://www.metasensemarketing.com/wp-content/uploads/2020/11/logo.png"]
}
</script>
```

Another example schema code applied to content of a website of a business entity using a JavaScript Object Notation for Linked Data (JSON-LD) encoding in a hypertext markup language (HTML) script tag, thereby generating a structure data object for the content, is disclosed below.

```
//JSON Example
<script type="application/ld+json">
{
"@context": "https://schema.org",
"@type": "Organization",
"address": {
"@type": "PostalAddress",
"addressLocality": "NJ, United States",
"postalCode": "08091",
"streetAddress": "403 Commerce Ln Suite 5, West Berlin"
},
"email": "info@metasensemarketing.com",
"member": [
{
"@type": "Organization"
},
{
"@type": "Organization"
}
],
"alumni": [
{
"@type": "Person",
"name": "Jatin V Mehta"
}
],
"name": "MetaSense Marketing Management Inc.",
"telephone": "866-875-META (6382)"
}
</script>
```

The above schema code is applied to website content rendered in the English language. In an embodiment, if the website content is rendered in a different language, for example, Hindi, Spanish, Italian, Turkish, etc., the media data optimization engine (MDOE) detaches the language using an artificial intelligence tool and converts the entire schema code above into the specific language of the website content. An example schema code applied to content of a website of a business entity using a Microdata encoding embedded in a hypertext markup language (HTML), thereby generating a structure data object for the content, is disclosed below.

```
//Microdata Example
<div itemscope itemtype="https://schema.org/Organization">
<span itemprop="name">MetaSense Marketing Management Inc.</span>
Contact Details:
<div itemprop="address" itemscope itemtype="https://schema.org/PostalAddress">
Main address:
<span itemprop="streetAddress">403 Commerce Ln Suite 5, West Berlin</span>
<span itemprop="postalCode">08091</span>
<span itemprop="addressLocality">NJ, United States</span>
</div>
Tel:<span itemprop="telephone">866-875-META (6382)</span>,
E-mail: <span itemprop="email">info@metasensemarketing.com</span>
<span itemprop="alumni" itemscope itemtype="https://schema.org/Person">
<span itemprop="name">Jatin V Mehta</span>
</span>,
History: We are a full-service digital marketing agency SEO company in New Jersey &
Philadelphia that takes pride in creating successful, comprehensive marketing plans and is
the only company in the world to offer the patented iMetaDex ™ technology.
</div>
```

An example schema code applied to content of a website of a business entity using a Resource Description Framework in Attributes (RDFa) encoding embedded in HTML, thereby generating a structure data object for the content, is disclosed below.

```
//RDFa Example
<div vocab="https://schema.org/" typeof="Organization">
<span property="name">MetaSense Marketing Management Inc.</span>
Contact Details:
<div property="address" typeof="PostalAddress">
Main address:
<span property="streetAddress">403 Commerce Ln Suite 5, West Berlin</span>
<span property="postalCode">08091</span>
<span property="addressLocality">NJ, United States</span>
</div>
Tel:<span property="telephone">866-875-META (6382)</span>,
E-mail: <span property="email">info@metasensemarketing.com</span>
<span property="alumni" typeof="Person">
<span property="name">Jatin V Mehta</span>
</span>
History: We are a full-service digital marketing agency SEO company in New Jersey &
Philadelphia that takes pride in creating successful, comprehensive marketing plans and is
the only company in the world to offer the patented iMetaDex ™ technology.
</div>
```

An example schema code applied to a textual object generated from a non-textual object, for example, a podcast episode object, identified in a website of a business entity, using a JSON-LD encoding in an HTML script tag, thereby generating a structure data object for the textual object, is disclosed below.

```
<script type="application/ld+json">
{
"@context": "https://schema.org/",
"@type": "PodcastEpisode",
"url": "https://www.metasensemarketing.com",
"name": "MetaSense Marketing Management Inc.",
"datePublished": "2015-02-18",
"timeRequired": "PT37M",
"description": "In the first episode of "Behind the App", a special series of Inquisitive, we take a look at the beginnings of iOS app development, by focusing on the introduction of the iPhone and the App Store.",
"associatedMedia": {
"@type": "MediaObject",
"contentUrl": "https://www.metasensemarketing.com/digitalmarketing.mp3"
},
"partOfSeries": {
"@type": "PodcastSeries",
```

```
"name": "MetaSense Marketing",
"url": "https://www.metasensemarketing.com"
}
}
</script>
```

An example schema code applied to a textual object generated from a non-textual object, for example, a podcast episode object, identified in a website of a business entity, using a Microdata encoding embedded in HTML, thereby generating a structure data object for the textual object, is disclosed below.

```
<div itemscope itemtype="https://schema.org/PodcastEpisode" class="episode_entry">
<h2>
<a itemprop="url" href="https://www.metasensemarketing.com">
<span itemprop="name">MetaSense Marketing Management Inc.</span>
</a>
</h2>
<small><time itemprop="datePublished" datetime="2015-02-18">February 18th, 2015</time></small>
<small><time itemprop="timeRequired" datetime="PT37M">37 minutes</time></small>
<p itemprop="description">
We are a full-service digital marketing agency SEO company in New Jersey & Philadelphia that takes pride in creating successful, comprehensive marketing plans and is the only company in the world to offer the patented iMetaDex ™ technology.
</p>
<p itemprop="associatedMedia" itemscope itemtype="https://schema.org/MediaObject">
Download:
<a itemprop="contentUrl"
href="https://www.metasensemarketing.com/digitalmarketing.mp3">
MP3 (<span itemprop="contentSize">25.75 MB</span>)
</a>
</p>
</div>
```

An example schema code applied to a textual object generated from a non-textual object, for example, an audio object comprising audio content, identified in a website of a business entity, using a JSON-LD encoding in an HTML script tag, thereby generating a structure data object for the audio content, is disclosed below.

```
<script type="application/ld+json">
  {
    "@context": "https://schema.org",
    "@type": "AudioObject",
    "contentUrl":
"https://www.metasensemarketing.com/searchengineoptimization.mp3",
    "description": "We are a full-service digital marketing agency SEO company in New Jersey & Philadelphia that takes pride in creating successful, comprehensive marketing plans and is the only company in the world to offer the patented iMetaDex ™ technology.",
    "duration": "T0M15S",
    "encodingFormat": "audio/mpeg",
    "name": "searchengineoptimization.mp3"
  }
</script>
```

An example schema code applied to a textual object generated from a non-textual object, for example, an audio object comprising audio content, identified in a website of a business entity, using a Microdata encoding embedded in HTML, thereby generating a structure data object for the audio content, is disclosed below.

```
<div itemscope itemtype="https://schema.org/AudioObject">
    <span itemprop="name"><b>searchengineoptimization.mp3</b></span>
    <script type="text/javascript">
    var fo = new
FlashObject("https://www.metasensemarketing.com/searchengineoptimization.swf",
    "flashPlayer_719", "358", "16", "6",
"#FFFFFF");fo.addVariable("url","https://www.metasensemarketing.com/searchengineop
timization.mp3");fo.addVariable("autostart", "0");fo.write("flashcontent_719");
    </script>
    <meta itemprop="encodingFormat" content="audio/mpeg" />
    <meta itemprop="contentUrl"
content="https://www.metasensemarketing.com/searchengineoptimization.mp3" />
    <span class="description">
        <meta itemprop="duration" content="T0M15S" />
        <span itemprop="description">We are a full-service digital marketing agency SEO
company in New Jersey & Philadelphia that takes pride in creating successful,
comprehensive marketing plans and is the only company in the world to offer the patented
iMetaDex ™ technology.</span>
    </span>
</div>
```

An example schema code applied to a textual object generated from a non-textual object, for example, an audio object comprising audio content, identified in a website of a business entity, using a Resource Description Framework in Attributes (RDFa) encoding embedded in HTML, thereby generating a structure data object for the audio content, is disclosed below.

```
<div vocab="https://schema.org/" typeof="AudioObject">
    <span property="name"><b>searchengineoptimization.mp3</b></span>
    <script type="text/javascript">
    var fo = new
FlashObject("https://www.metasensemarketing.com/searchengineoptimization.swf",
    "flashPlayer_719", "358", "16", "6",
"#FFFFFF");fo.addVariable("url", "https://www.metasensemarketing.com/searchengineop
timization.mp3");fo.addVariable("autostart", "0");fo.write("flashcontent_719");
    </script>
    <meta property="encodingFormat" content="audio/mpeg" />
    <meta property="contentUrl"
content="https://www.metasensemarketing.com/searchengineoptimization.mp3" />
    <span class="description">
        <meta property="duration" content="T0M15S" />
        <span property="description">We are a full-service digital marketing agency SEO
company in New Jersey & Philadelphia that takes pride in creating successful,
comprehensive marketing plans and is the only company in the world to offer the
patented iMetaDex ™ technology.</span>
    </span>
</div>
```

An example schema code applied to a textual object generated from a non-textual object, for example, a video object comprising video content, identified in a website of a business entity, using a JSON-LD encoding in an HTML script tag, thereby generating a structure data object for the video content, is disclosed below.

```
<script type="application/ld+json">{
    "@context": "http://schema.org",
    "@type": "VideoObject",
    "name": "MetaSense Marketing Management Inc.",
    "description": "We are a full-service digital marketing agency SEO company in New
Jersey & Philadelphia that takes pride in creating successful, comprehensive marketing
plans and is the only company in the world to offer the patented iMetaDex ™ technology.",
```

```
"thumbnailUrl": "https://www.metasensemarketing.com/default.jpg",
"uploadDate": "2018-04-16T08:01:27Z",
"duration": "PT4M43S",
"embedUrl": "https://www.youtube.com/embed/0GuW_UjNZwY",
"interactionCount": "781"
}
</script>
```

An example schema code applied to a textual object generated from a non-textual object, for example, a video object comprising video content, identified in a website of a business entity, using a Microdata encoding embedded in HTML, thereby generating a structure data object for the video content, is disclosed below.

```
<div itemprop="video" itemscope itemtype="http://schema.org/VideoObject">
    <h2><span itemprop="name">MetaSense Marketing Management Inc.</span></h2>
    <meta itemprop="duration" content="PT4M43S" />
    <meta itemprop="uploadDate" content="2018-04-16T08:01:27Z" />
    <meta itemprop="thumbnailURL" content="https://www.metasensemarketing.com/default.jpg" />
    <meta itemprop="interactionCount" content="781" />
    <meta itemprop="embedURL" content="https://www.youtube.com/embed/0GuW_UjNZwY" />
    <div id="schema-videoobject" class="video-container"><iframe width="853" height="480" src="https://www.youtube.com/embed/0GuW_UjNZwY?rel=0&controls=0&showinfo=0" frameborder="0" allowfullscreen></iframe></div>
    <span itemprop="description">We are a full-service digital marketing agency SEO company in New Jersey & Philadelphia that takes pride in creating successful, comprehensive marketing plans and is the only company in the world to offer the patented iMetaDex ™ technology.</span>
</div>
```

An example schema code applied to a textual object generated from a non-textual object, for example, a virtual reality object comprising virtual reality content, using a Microdata encoding embedded in HTML, thereby generating a structure data object for the virtual reality content, is disclosed below.

```
<div itemscope itemtype="https://schema.org/Article">
    <span itemprop="name">MetaSense Marketing Management Inc.</span>
    by <span itemprop="author">Jatin V Mehta</span>
    We are a full-service digital marketing agency SEO company in New Jersey & Philadelphia that takes pride in creating successful, comprehensive marketing plans and is the only company in the world to offer the patented iMetaDex ™ technology.
    <div itemprop="interactionStatistic" itemscope itemtype="https://schema.org/InteractionCounter">
        <div itemprop="interactionService" itemscope itemid="https://twitter.com/MetaSense" itemtype="https://schema.org/WebSite">
            <meta itemprop="name" content="Twitter" />
        </div>
        <meta itemprop="interactionType" content="https://schema.org/ShareAction"/>
        <meta itemprop="userInteractionCount" content="1203" />
    </div>
    <div itemprop="interactionStatistic" itemscope itemtype="https://schema.org/InteractionCounter">
        <meta itemprop="interactionType" content="https://schema.org/CommentAction"/>
        <meta itemprop="userInteractionCount" content="78" />
    </div>
</div>
```

An example schema code applied to a textual object generated from a non-textual object, for example, a virtual reality object comprising virtual reality content, using a Resource Description Framework in Attributes (RDFa) encoding embedded in HTML, thereby generating a structure data object for the virtual reality content, is disclosed below.

```
<div vocab="https://schema.org/" typeof="Article">
    <span property="name">MetaSense Marketing Management Inc.</span>
    by <span property="author">Jatin V Mehta</span>
    We are a full-service digital marketing agency SEO company in New Jersey &
Philadelphia that takes pride in creating successful, comprehensive marketing plans and is
the only company in the world to offer the patented iMetaDex ™ technology.
        <div property="interactionStatistic" typeof="InteractionCounter">
            <div property="interactionService" typeof="WebSite">
                <meta property="url" content="https://twitter.com/MetaSense"/>
                <meta property="name" content="Twitter" />
            </div>
            <meta property="interactionType" content="https://schema.org/ShareAction"/>
            <meta property="userInteractionCount" content="1203" />
        </div>
        <div property="interactionStatistic" typeof="InteractionCounter">
            <meta property="interactionType" content="https://schema.org/CommentAction"/>
            <meta property="userInteractionCount" content="78" />
        </div>
</div>
```

Furthermore, in the method disclosed herein, the media data optimization engine (MDOE) generates 105 a dynamic index-oriented object for the structured data objects specific to the business entity as disclosed in Applicant's non-provisional patent application titled "Dynamic Website Characterization for Search Optimization", application Ser. No. 17/692,061, which is incorporated herein by reference in its entirety. The MDOE determines where the structured data objects fit in the electronic document, for example, a website, and then generates the dynamic index-oriented object. The dynamic index-oriented object configures the structured data objects based on requirements of the business entity's electronic document to be read by web resources, for example, search engines, social networks, databases such as JavaScript Object Notation (JSON) databases, etc. In an embodiment, the MDOE stores the structured data objects in a dynamic index-oriented object database.

The media data optimization engine (MDOE) connects 106 the structured data objects to the dynamic index-oriented object by creating linked data nodes from the structured data objects with the dynamic index-oriented object as a core. The MDOE, therefore, evolves the structured data objects into the dynamic index-oriented object. In an embodiment, the linked data nodes of the dynamic index-oriented object are JavaScript Object Notation for Linked Data (JSON-LD) nodes. In another embodiment, the linked data nodes of the dynamic index-oriented object are Microdata nodes. In another embodiment, the linked data nodes of the dynamic index-oriented object are Resource Description Framework in Attributes (RDFa) nodes. The MDOE connects 107 the dynamic index-oriented object with the linked data nodes to the electronic document, thereby facilitating dynamic changes to the electronic document and dynamically optimizing the electronic document. As used herein, "dynamic changes" refers to automatic addition of the dynamic index-oriented object with the linked data nodes to the electronic document by the MDOE after processing, analysis, and creation of the structured data objects for the content of the electronic document in the connected framework formed between the MDOE and the electronic document. In an embodiment, the dynamic changes comprise automatic addition of new linked data nodes associated with new media content to the dynamic index-oriented object, and in turn, to the electronic document in the connected framework formed between the MDOE and the electronic document. Through the connected framework, the MDOE dynamically incorporates changes into the electronic document, without manual user intervention from the business entity.

The media data optimization engine (MDOE) connects the dynamic index-oriented object with the linked data nodes to the electronic document, for example, using an application programming interface (API) key. For example, the MDOE optimizes a business website for the business entity by connecting the linked data nodes, for example, the JavaScript Object Notation for Linked Data (JSON-LD) nodes, the Microdata nodes, the Resource Description Framework in Attributes (RDFa) nodes, etc., with the dynamic index-oriented object at its core to the website of the business entity using an API key. The MDOE fetches the details of a target type, for example, business type, offers, services, articles, products, etc., as content relevant to the business, from the API key and converts the details into a schema code. In an embodiment, the dynamic changes to the electronic document are facilitated free of recreation of the structured data objects using the created linked data nodes of the dynamic index-oriented object. The MDOE facilitates dynamic changes to the electronic document without recreating the structured data objects by using the connection of the linked data nodes, for example, the JSON-LD nodes, the Microdata nodes, the RDFa nodes, etc., with the dynamic index-oriented object at its core to the website.

When new media content, for example, new video content, audio content, etc., and other content is added to a website, the media data optimization engine (MDOE) automatically re-analyzes the website, detects the presence of the video content, the audio content, etc., generates textual objects therefrom, transforms the generated textual objects into structured data objects by applying optimal schema codes to the generated textual objects, and connects these additional structured data objects to the dynamic index-oriented object assigned to the business entity, as additional linked data nodes. The dynamic index-oriented object acts as a main profile for the business entity, which is dynamically updated as new media content and other content is added to the website. For example, while a website previously contained structured data objects as linked data nodes for content such as "Article" and "Small Business", the MDOE updates the website to contain the additional structured data objects as linked data nodes for the newly added media content. The MDOE, therefore, creates a dynamic electronic document, for example, a dynamic website, with the dynamic index-oriented object and its linked data nodes therein changing the manner in which the dynamic website is crawled and indexed. The MDOE renders the linked data nodes to a search engine based on relevance of structured data tags defined in the linked data nodes. The MDOE ensures that the website is optimally indexed at all times in response to a search query on a search engine, a social network, etc., or in response to a database query.

In addition to automatically creating structured data objects for textual objects generated from non-textual objects comprising media content, for example, audio content, video content, etc., in an electronic document of a business entity, the media data optimization engine (MDOE) also creates a level of dynamic integration for those non-textual objects. For example, the dynamic integration pushes a video object for video searches on a search engine such as the Google® search engine of Google LLC, and then performs a shift by pushing a business entity's business hours for a business name search on the search engine. The MDOE utilizes platform(s) created by the search engine(s) and the collaborative schema data source(s), for example, schema.org, to generate an enhanced, more relevant object, that is, the dynamic index-oriented object, depending on search intent. The MDOE facilitates the generation of this dynamic index-oriented object by establishing a connection between the dynamic index-oriented object database maintained by the MDOE and the website of the business entity. In an embodiment, the MDOE implements an application programming interface (API) connection or a secure connection through a blockchain in a decentralized environment to establish the connection between the dynamic index-oriented object database and the website of the business entity.

In an embodiment, in response to a search query, the media data optimization engine (MDOE) fits one or more of the linked data nodes of the dynamic index-oriented object to the search query. The MDOE detects the search query, by using one or more detection tools in operable communication with search engines and media platforms, for example, the Google® search engine of Google LLC, the Bing® search engine of Microsoft Corporation, the Facebook® social media and networking platform of Facebook, Inc., the Instagram® photo and video sharing social networking platform of Instagram, LLC, the Twitter® microblogging and social networking platform of Twitter, Inc., the Amazon® electronic commerce (ecommerce) platform of Amazon Technologies, Inc., etc., and fits one or more of the linked data nodes of the dynamic index-oriented object to the search query using artificial intelligence. In an embodiment, the MDOE utilizes weblogs or a tool that recognizes the search query made to arrive on a webpage and then rotates the dynamic index-oriented object to render the best possible linked data node to fit the search query.

When the media data optimization engine (MDOE) receives search queries using an identified internet protocol (IP) address from a social media platform, the MDOE recognizes the search queries as social media queries and the dynamic index-oriented object traverses a social media object path. The MDOE determines the platform, for example, a search engine, a social media platform, etc., from where a search query is made; determines the language of the search query and the social media category such as a query search from a social media platform; and implements the dynamic index-oriented object based on the social media platform and the social media category to fit the best possible linked data node to the search query. For example, if the MDOE determines that a search query is made on the Facebook® social media and networking platform, the MDOE incorporates a Facebook® schema implementation in the dynamic index-oriented object, which pushes the best possible linked data node to fit the search query on the Facebook® social media and networking platform. The dynamic electronic document, for example, the dynamic website of the business entity, rendered by the MDOE provides more indexable and recognizable data to any searches performed by users on search engines and media platforms, without having to manually maintain the code, line by line. The MDOE follows protocols for sharing structured data and automatically updates the website to fit search intent better. A generic computer using a generic program cannot generate a dynamic index-oriented object for the structured data objects specific to the business entity, connect the structured data objects to the dynamic index-oriented object, and connect the dynamic index-oriented object with the linked data nodes to the electronic document, thereby facilitating dynamic changes to the electronic document and dynamically optimizing the electronic document, in accordance with the method steps disclosed above.

Figure 2:
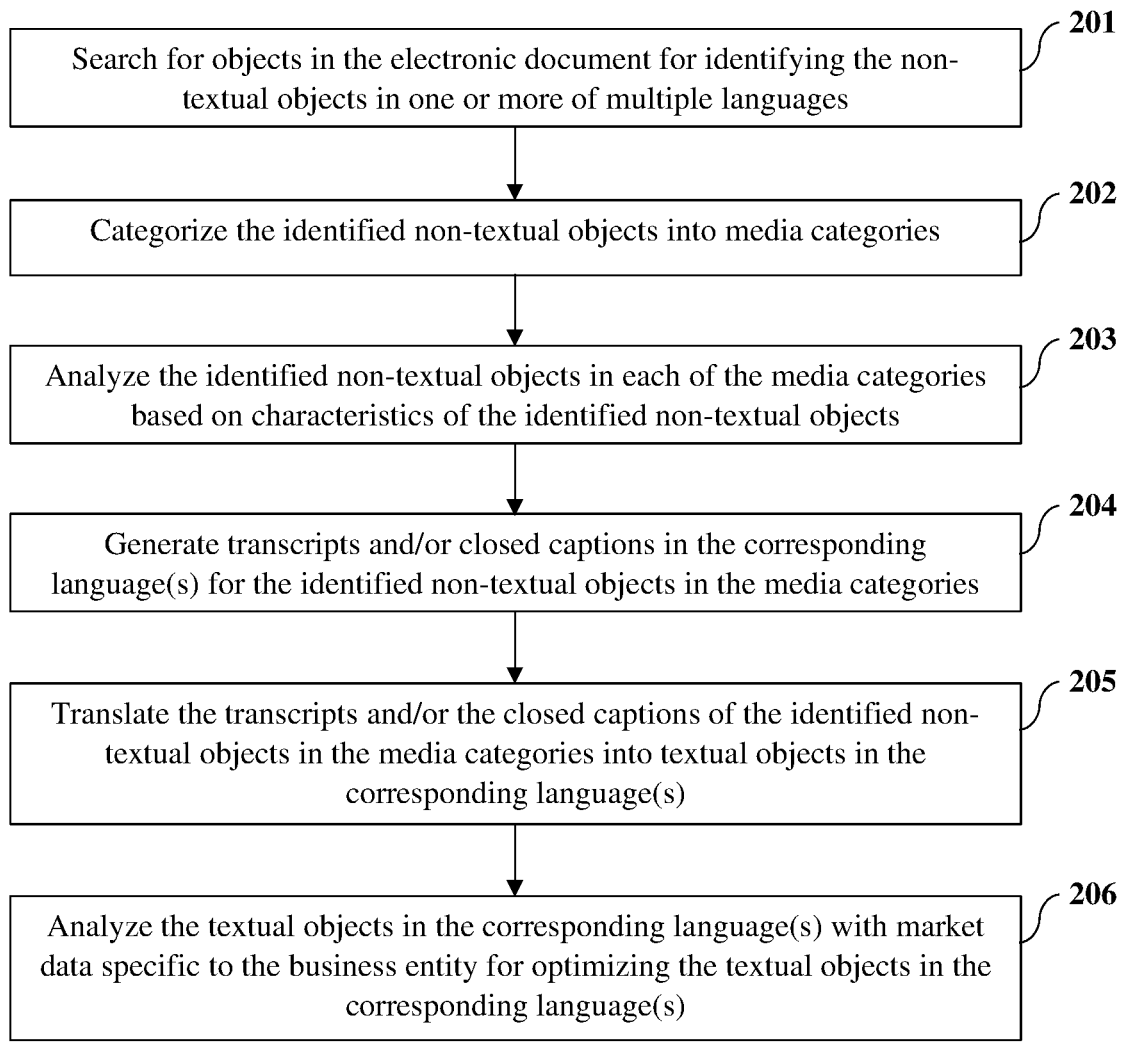
FIG. 2 exemplarily illustrates a flowchart of an embodiment of a method for generating textual objects in one or more of multiple languages from non-textual objects identified in an electronic document.

FIG. 2 exemplarily illustrates a flowchart of an embodiment of a method for generating textual objects in one or more of multiple languages from non-textual objects identified in an electronic document. In an embodiment, the media data optimization engine (MDOE) generates textual objects in one or more of multiple languages from the identified non-textual objects as follows. The MDOE searches 201 for objects in the electronic document for identifying the non-textual objects in one or more of multiple languages. The MDOE categorizes 202 the identified non-textual objects into media categories. The media categories comprise, for example, an image category, an audio category, a video category, an animation category, a multimedia category, etc., and any combination thereof. In an embodiment, the MDOE analyzes 203 the identified non-textual objects in each of the media categories based on characteristics of the identified non-textual objects. The characteristics comprise, for example, duration of the non-textual objects, bit rate, file size in bytes, a uniform resource locator (URL) pointing to a player for the non-textual objects such as audio objects, video objects, etc., media type, three-dimensional model characteristics, dataset, place, digital document, etc.

The media data optimization engine (MDOE) determines the language(s) of the identified non-textual objects in the media categories and generates 204 transcripts and/or closed captions (CCs) in the corresponding language(s) for the identified non-textual objects in the media categories. For example, the MDOE generates transcripts for the audio objects and the animation objects identified in the electronic document. The MDOE generates transcripts by converting non-textual objects, for example, audio objects and animation objects, into text data or text files in the corresponding language(s). In another example, the MDOE generates closed captions for the video objects identified in the electronic document. In an embodiment, the MDOE generates closed captions by transcribing audio content of video objects and/or by including descriptions of non-speech or non-audio content of the video objects. The MDOE transcribes, for example, dialogue, sound effects, music cues, and other relevant audio content of the video objects in the corresponding language(s). The MDOE converts the non-textual objects in their corresponding language(s) into textual objects using software tools and technologies, for example, video editors such as VEED.IO, the Kapwing® video editor of Kapwing Corporation, Adobe® Creative Cloud Express of Adobe Inc., etc., audio transcription, translation, captioning, and video subtitling applications such as the Maestra® transcription editor of Maestra LLC, the ftw transcriber, ° Transcribe, the Express Scribe audio player software, etc. The MDOE translates 205 the transcripts and/or the closed captions of the identified non-textual objects in the media categories into textual objects in the corresponding language(s) by executing translation algorithms similar to those of Google Translate of Google, LLC, the BabelFish™ translator of The Babel Fish Corporation, etc. The MDOE analyzes 206 the textual objects in the corresponding language(s) with market data specific to the business entity for optimizing and increasing accuracy of the textual objects in the corresponding language(s). The market data for optimizing the textual objects in the corresponding language(s) comprise, for example, geographical data, local data, image data, keyword search data, etc., and any combination thereof. In an embodiment, the MDOE employs different technologies, for example, artificial intelligence, machine learning, fuzzy logic, and data science in various algorithms to analyze the textual objects in the corresponding language(s). A generic computer using a generic program cannot generate textual objects from non-textual objects identified in an electronic document in any combination in accordance with the method steps disclosed above.

Figure 3:
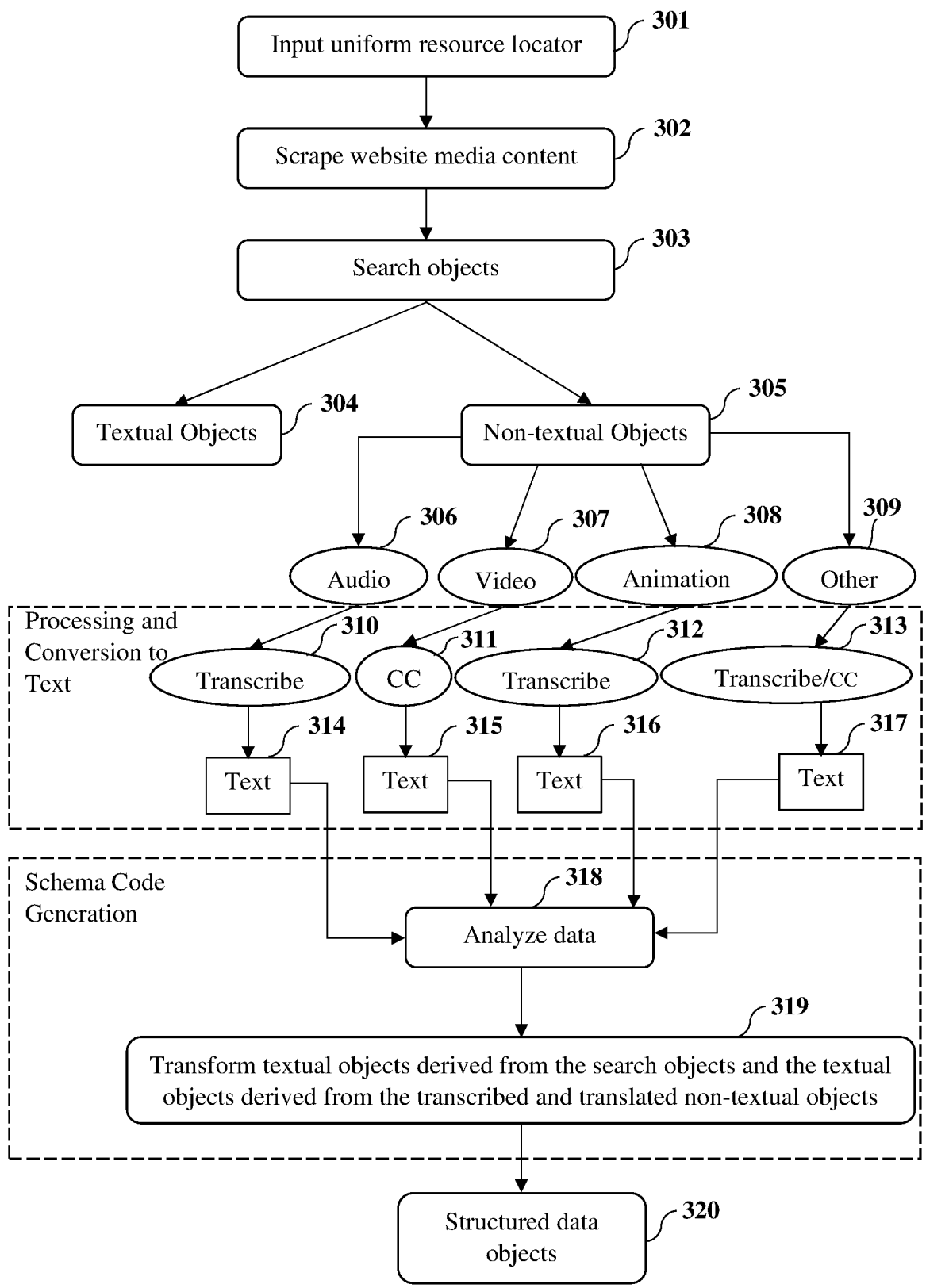
FIG. 3 exemplarily illustrates a flowchart of an embodiment of a method for transforming textual objects in one or more of multiple languages into structured data objects.

FIG. 3 exemplarily illustrates a flowchart of an embodiment of a method for transforming textual objects in one or more of multiple languages into structured data objects. Consider an example where the media data optimization engine (MDOE) receives an input, for example, a uniform resource locator (URL) 301 of a website of a business entity via a user interface such as a graphical user interface (GUI) rendered by the MDOE. The process initiates with the MDOE searching the URL of the website. The MDOE accesses the website and scrapes 302 website media content comprising, for example, video content, audio content, audiovisual content, animation content, multimedia content, etc., using the URL of the website. The MDOE performs data scraping, also known as web scraping, of the electronic document using, for example, automated data extraction software, web scraping tools, etc., to extract the website media content. The MDOE searches 303 for objects in the extracted website media content. The objects in the website media content are typically categorized into textual objects 304 and non-textual objects 305. The MDOE identifies the textual objects 304 on the website by searching for keywords queried by users, for example, through search engines. The MDOE identifies the non-textual objects 305 on the website and categorizes the non-textual objects 305 based on the media categories in multiple buckets, for example, as audio objects 306, video objects 307, animation objects 308, other media objects 309 such as meta files, any combination of text, audio, video, animations, etc., as exemplarily illustrated in FIG. 3. For identifying the non-textual objects 305, the MDOE searches, for example, for images, audio files, video files, animations, etc., and any combination thereof, on the website.

The media data optimization engine (MDOE) then transports the identified non-textual objects 305 into different buckets as different media objects 306, 307, 308, and 309. Once the identified non-textual objects 305 are transported into the different buckets, the MDOE proceeds to process and convert the identified non-textual objects 305 into textual objects in their corresponding languages. During the processing and conversion to text, the MDOE analyzes the media objects 306, 307, 308, and 309 in each of the buckets based on their characteristics, and transcribes the media objects 306, 308, and 309 and/or performs closed captioning on the media objects 307 and 309. For example, the MDOE analyzes the audio objects 306 and the animation objects 308 based on their characteristics and transcribes 310, 312 or generates transcripts of the audio objects 306 and the animation objects 308. In another example, the MDOE analyzes the video objects 307 based on their characteristics and generates closed captions 311 for the video objects 307. Similarly, the MDOE analyzes the other media objects 309 based on their characteristics and generates transcripts and/or closed captions 313 for the other media objects 309. The MDOE then performs a final translation by translating the transcripts and/or the closed caption files into text files 314, 315, 316, and 317 in their corresponding languages.

In an embodiment, if the identified non-textual objects 305 are rendered in a natural language other than English, the media data optimization engine (MDOE) translates the transcripts and/or closed captions generated for the identified non-textual objects 305 into English by executing translation algorithms similar to or the same as those of Google Translate of Google, Inc., the BabelFish™ translator of The Babel Fish Corporation, etc., and then proceeds to perform a final translation by translating the transcripts and/or the closed caption files into text files 314, 315, 316, and 317. In another embodiment, the MDOE performs a final translation of the transcripts and/or the closed caption files into text files 314, 315, 316, and 317 without translating the transcripts and/or closed captions from one natural language to another natural language, and directly recognizes the language of the identified non-textual objects 305 and proceeds to translate the transcripts and/or the closed caption files into text files 314, 315, 316, and 317 in their corresponding languages. In an embodiment, the MDOE implements third-party tools, technology, and related application programming interfaces (APIs) for performing the transcription and/or the translation disclosed above.

The media data optimization engine (MDOE) then proceeds to perform schema code generation. In the process of schema code generation, the MDOE analyzes 318 text data in the text files 314, 315, 316, and 317 and compares the text files 314, 315, 316, and 317 with market data for the business entity using, for example, geographical data, local data, images, and other types of keyword searches to increase the accuracy of the text files 314, 315, 316, and 317. In an embodiment, the MDOE employs different technologies, for example, artificial intelligence, machine learning, fuzzy logic, and data science in various algorithms to analyze the text data in the text files 314, 315, 316, and 317. The MDOE identifies relevant schema codes for the textual objects using different criteria comprising, for example, templates, content derived from the website, content derived from the generated textual objects in their corresponding language(s), structured data markup schemas, best practices associated with schemas to suit multiple linked data object categories, etc., and any combination thereof.

In an embodiment, the media data optimization engine (MDOE) collects information comprising, for example, image name, media file name, alt, title, etc., using a data scraping process and appends additional information of the business entity to prepare the schema codes. In an embodiment, if the textual objects are in a different language, for example, Hindi, Spanish, Italian, Turkish, etc., the MDOE detaches the language using an artificial intelligence tool and converts the schema codes into the specific language of the textual objects. The MDOE processes the text files 314, 315, 316, and 317 as textual objects and transforms the textual objects into structured data objects by applying the identified schema codes to the textual objects, for example, in accordance with schemas provided by a collaborative schema data source or a third party organization that multiple search engines comply with, using artificial intelligence (AI)-based technology as disclosed in Applicant's patent titled "Content Validation and Coding for Search Engine Optimization" with application Ser. No. 15/834,228, issued as U.S. Pat. No. 10,698,960.

The media data optimization engine (MDOE) transforms 319 the textual objects 304 derived from the searched objects and the textual objects derived from the transcribed and translated non-textual objects 305, that is, from the text files 314, 315, 316, and 317, into structured data objects 320. In an embodiment, the MDOE determines optimal schema codes from a categorized repository provided, for example, by schema.org or created by the MDOE, for automatic creation of the structured data objects 320. The MDOE identifies which schema codes are most relevant for a business entity's website for automatic creation of the structured data objects 320. The MDOE sifts through the schema codes and structured data tags in the categorized repository and targets the optimal schema codes with the structured data tags that are relevant to the business entity that provided the electronic document and a ranking requirement of the business entity. For example, the MDOE identifies "location" as a significant factor for a business entity to optimize the website of the business entity for web traffic. The MDOE identifies and weighs schema codes, for example, an offer schema code and a product schema code. The MDOE assigns a higher weight to the offer schema code than to the product schema code as the offer schema code allows location-based item properties. Furthermore, the MDOE generates, analyzes, and harnesses structured data for multilanguage media content of different types and combinations rendered in electronic documents, optimally to enhance search engine optimization of multilanguage electronic documents. A generic computer using a generic program cannot generate multilanguage textual objects from multilanguage non-textual objects identified in the multilanguage electronic document and transform the generated multilanguage textual objects into structured data objects based on configurable criteria in accordance with the method steps disclosed above.

In an embodiment, the media data optimization engine (MDOE) dynamically assigns the structured data objects 320 to a group in the form of a dynamic index-oriented object. The MDOE presents the structured data objects 320 and in turn, the dynamic index-oriented object created for the structured data objects 320 to one or more web resources, for example, search engines. The MDOE outputs the structured data objects 320 that optimally describe the website of the business entity and increase the interpretation and comprehensibility of the website by the web resources. The MDOE, therefore, automatically creates structured data objects 320 for media content of different types and combinations rendered in one or more of multiple languages in the website of the business entity, and dynamically optimizes the website for enhanced indexation by search engines and improved listings in search results. The MDOE aids in enhancing visibility of the website in results provided by search engines to maximize the number of visitors viewing the website.

Figure 4:
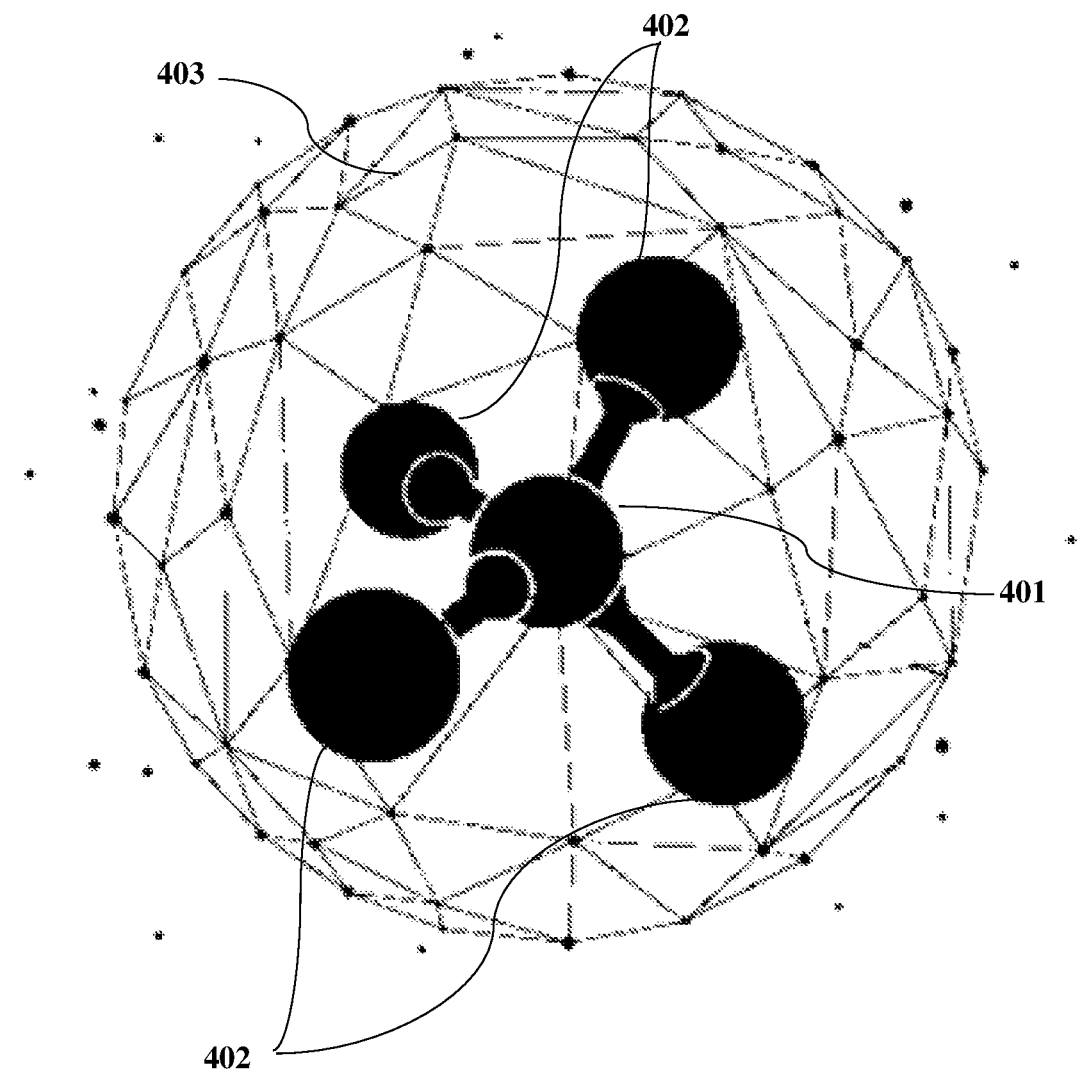
FIG. 4 exemplarily illustrates a schematic of a dynamic index-oriented object generated for structured data objects specific to a business entity, by a media data optimization engine.

FIG. 4 exemplarily illustrates a schematic of a dynamic index-oriented object 401 generated for structured data objects specific to a business entity, by a media data optimization engine (MDOE). After transforming textual objects derived from the objects searched on an electronic document, for example, a website of the business entity or a webpage of a website, and the textual objects derived from the transcribed and translated non-textual objects into structured data objects, the MDOE generates a dynamic index-oriented object 401 with multiple facets for the structured data objects specific to the business entity as disclosed in the description of FIG. 1. The MDOE connects the structured data objects to the dynamic index-oriented object 401 by creating linked data nodes 402, for example, JavaScript Object Notation for Linked Data (JSON-LD) nodes, from the structured data objects with the dynamic index-oriented object 401 as a core as exemplarily illustrated in FIG. 4 and as disclosed in Applicant's non-provisional patent application titled "Dynamic Website Characterization for Search Optimization", application Ser. No. 17/692,061, which is incorporated herein by reference in its entirety. The MDOE creates the linked data nodes 402 based on the analysis and pre-built templates that adhere to standards defined, for example, by schema.org and search engine providers such as Google Inc, Microsoft Corporation, Yahoo! Inc., Yandex, Ltd., etc. The dynamic index-oriented object 401 is a center-facing item in the JSON-LD code of the business entity's website. The MDOE updates the website by connecting the dynamic index-oriented object 401 with the linked data nodes 402 to the website, for example, using an application programming interface (API) key, which facilitates dynamic changes to the website for dynamically optimizing the web site.

After the dynamic index-oriented object 401 with the linked data nodes 402 is generated and connected to the website, the dynamic index-oriented object 401 shifts the linked data nodes 402 to fit appropriate categories of the structured data objects for display on any web resource, for example, any search engine, social network, or database, in response to a search query 403. Once the media data optimization engine (MDOE) creates and optimizes the dynamic index-oriented object 401, the dynamic index-oriented object 401 pushes one of the linked data nodes 402 to the front for specific searches, filling in blanks in the business entity's website, and ensuring characteristics of the business entity's website are crawled, cataloged, and displayed by any web resource, for example, any search engine, social media platform, or database containing information of the business entity relevant to the search query 403.

Consider an example where the media data optimization engine (MDOE) receives an input uniform resource locator (URL) of the website of the business entity via a graphical user interface (GUI) rendered by the MDOE. The MDOE accesses and analyzes the website and automatically creates structured data objects for the website. In an embodiment, the MDOE employs different technologies, for example, artificial intelligence, machine learning, fuzzy logic, and data science in various algorithms to analyze the website. The MDOE automatically creates the structured data objects using, for example, templates, content from the website, and best practices from a collaborative schema data source or a third-party organization, for example, schema.org, to suit each type of JavaScript Object Notation for Linked Data (JSON-LD) object category. In an embodiment, the MDOE identifies and weighs schema codes by a combination of analyzing the media content and other content of the website and the content related to the website from one or more search engines and/or media platforms, analyzing the categorized repository of schema codes, and determining optimal schema codes that are relevant to search. The MDOE filters the schema codes, for example, using search engine optimization (SEO) best practices documentation, the content present on the website, and the categorized repository to determine the optimal schema codes. The categorized repository comprises categories that affect a website's content, for example, local business, postal address, hours, product, offerings, services, articles, reviews, etc. Of each individual structured data tag, the MDOE drills down on the specific item properties that affect a website's media content based on multiple web sites designed, the results gained from designing those websites, and an understanding of what businesses try to be found for in search engines with keywords. The MDOE utilizes the SEO best practices defined based on standards set, for example, by Google LLC, SEOmoz, Inc., etc., and SEO campaigns. Businesses try to be found for their name, their industry, their location and local area, and the products and services they provide. The MDOE, therefore, targets the coding on those areas. In an embodiment, SEO guidelines implemented to create the structured data objects by applying the schema codes into a website's content are written directly into the hypertext markup language (HTML) code of the website. The MDOE targets the indexing schema codes into what will have the strongest impact and most relevance for a business entity and its website based on SEO best practices and data for what businesses are trying to be found.

In an embodiment, the media data optimization engine (MDOE) determines the optimal schema codes, for example, based on a business type or an industry type and search ranking factors listed, for example, by a guide of search engine optimization (SEO) best practices. The search ranking factors in a hierarchy comprise, for example, business name, location of the business entity, products and services offered by the business entity, business details, phrases about products and services offered by the business entity, phrases that help the MDOE identify the location of the business entity, new content that is categorized as a piece of creative work or a specific piece of creative work, reviews related to the business entity, people relevant to the business entity, etc. The MDOE implements a guideline or a standard on how to code the determined optimal schema codes into a website's content for automatically creating the structured data objects. The use of these optimal schema codes with new content updates creates a more powerful optimization for a website. By utilizing the method disclosed herein on each new article, whitepaper, review, blog post, biography of a website, media content such as video content, audio content, etc., the MDOE adds in backend coding assistance to the website's overall optimization effort.

The media data optimization engine (MDOE) stores the created structured data objects in the dynamic index-oriented object database for the business entity. The MDOE connects the stored structured data objects to the dynamic index-oriented object 401 as linked data nodes 402, for example, JSON-LD nodes, around a core of the business entity. The MDOE connects the dynamic index-oriented object 401 to the website of the business entity, for example, through an application programming interface (API) key, which facilitates dynamic changes to the textual content and the non-textual media content on the website. When a search engine, a social media platform, or a database attempts to connect to the textual content and the non-textual media content on the website through a primary connection channel, for example, a search query 403, the dynamic index-oriented object 401 fits an appropriate one of the linked data nodes 402 to the search query 403.

A code snippet showing connection of the dynamic index-oriented object 401 with the linked data nodes 402 to media content in the original code of the website is disclosed below.

```
//Microdata PodcastEpisode Example
<div itemscope itemtype="https://schema.org/PodcastEpisode" class="episode_entry">
<h2>
<a itemprop="url" href="https://www.metasensemarketing.com">
<span itemprop="name">MetaSense Marketing Management Inc.</span>
</a>
</h2>
<small><time itemprop="datePublished" datetime="2015-02-18">February 18th,
2015</time></small>
<small><time itemprop="timeRequired" datetime="PT37M">37 minutes</time></small>
<p itemprop="description">
We are a full-service digital marketing agency SEO company in New Jersey & Philadelphia
that takes pride in creating successful, comprehensive marketing plans and is the only
company in the world to offer the patented iMetaDex ™ technology.
</p>
<p itemprop="associatedMedia" itemscope itemtype="https://schema.org/MediaObject">
Download:
<a itemprop="contentUrl"
href="https://www.metasensemarketing.com/digitalmarketing.mp3">
MP3 (<span itemprop="contentSize">25.75 MB</span>)
</a>
</p>
</div>
//JSON PodcastEpisode Example
<script type="application/ld+json">
{
"@context": "https://schema.org/",
"@type": "PodcastEpisode",
"url": "https://www.metasensemarketing.com",
"name": "MetaSense Marketing Management Inc.",
"datePublished": "2015-02-18",
"timeRequired": "PT37M",
```

-continued

```
"description": "In the first episode of "Behind the App", a special series of Inquisitive, we
take a look at the beginnings of iOS app development, by focusing on the introduction of
the iPhone and the App Store.",
"associatedMedia": {
"@type": "MediaObject",
"contentUrl": "https://www.metasensemarketing.com/digitalmarketing.mp3"
},
"partOfSeries": {
"@type": "PodcastSeries",
"name": "MetaSense Marketing",
"url": "https://www.metasensemarketing.com"
}
}
</script>
//Microdata AudioObject Example
    <div itemscope itemtype="https://schema.org/AudioObject">
      <span itemprop="name"><b>searchengineoptimization.mp3</b></span>
    <script type="text/javascript">
     var fo = new
FlashObject("https://www.metasensemarketing.com/searchengineoptimization.swf",
       "flashPlayer_719", "358", "16", "6",
"#FFFFFF");fo.addVariable("url","https://www.metasensemarketing.com/searchengineop
timization.mp3");fo.addVariable("autostart", "0");fo.write("flashcontent_719");
    </script>
    <meta itemprop="encodingFormat" content="audio/mpeg" />
      <meta itemprop="contentUrl"
content="https://www.metasensemarketing.com/searchengineoptimization.mp3" />
    <span class="description">
        <meta itemprop="duration" content="T0M15S" />
        <span itemprop="description">We are a full-service digital marketing agency SEO
company in New Jersey & Philadelphia that takes pride in creating successful,
comprehensive marketing plans and is the only company in the world to offer the patented
iMetaDex ™ technology.</span>
    </span>
    </div>
//RDFa AudioObject Example
    <div vocab="https://schema.org/" typeof="AudioObject">
      <span property="name"><b>searchengineoptimization.mp3</b></span>
    <script type="text/javascript">
     var fo = new
FlashObject("https://www.metasensemarketing.com/searchengineoptimization.swf",
       "flashPlayer_719", "358", "16", "6",
"#FFFFFF");fo.addVariable("url","https://www.metasensemarketing.com/searchengineop
timization.mp3");fo.addVariable("autostart", "0");fo.write("flashcontent_719");
    </script>
    <meta property="encodingFormat" content="audio/mpeg" />
      <meta property="contentUrl"
content="https://www.metasensemarketing.com/searchengineoptimization.mp3" />
    <span class="description">
        <meta property="duration" content="T0M15S" />
        <span property="description">We are a full-service digital marketing agency SEO
company in New Jersey & Philadelphia that takes pride in creating successful,
comprehensive marketing plans and is the only company in the world to offer the patented
iMetaDex ™ technology.</span>
    </span>
    </div>
//JSON AudioObject Example
    <script type="application/ld+json">
    {
      "@context": "https://schema.org",
      "@type": "AudioObject",
      "contentUrl":
"https://www.metasensemarketing.com/searchengineoptimization.mp3",
      "description": "We are a full-service digital marketing agency SEO company in New
Jersey & Philadelphia that takes pride in creating successful, comprehensive marketing
plans and is the only company in the world to offer the patented iMetaDex ™ technology.",
      "duration": "T0M15S",
      "encodingFormat": "audio/mpeg",
      "name": "searchengineoptimization.mp3"
    }
    </script>
//Microdata VideoObject Example
  <div itemprop="video" itemscope itemtype="http://schema.org/VideoObject">
        <h2><span itemprop="name">MetaSense Marketing Management
Inc.</span></h2>
        <meta itemprop="duration" content="PT4M43S" />
        <meta itemprop="uploadDate" content="2018-04-16T08:01:27Z" />
        <meta itemprop="thumbnailURL"
```

```
content="https://www.metasensemarketing.com/default.jpg" />
        <meta itemprop="interactionCount" content="781" />
        <meta itemprop="embedURL"
content="https://www.youtube.com/embed/0GuW_UjNZwY" />
        <div id="schema-videoobject" class="video-container"><iframe width="853"
height="480"
src="https://www.youtube.com/embed/0GuW_UjNZwY?rel=0&controls=0&sh
owinfo=0" frameborder="0" allowfullscreen></iframe></div>
        <span itemprop="description">We are a full-service digital marketing agency
SEO company in New Jersey & Philadelphia that takes pride in creating successful,
comprehensive marketing plans and is the only company in the world to offer the patented
iMetaDex ™ technology.</span>
    </div>
//JSON VideoObject Example
<script type="application/ld+json">{
 "@context": "http://schema.org",
 "@type": "VideoObject",
 "name": "MetaSense Marketing Management Inc.",
 "description": "We are a full-service digital marketing agency SEO company in New
Jersey & Philadelphia that takes pride in creating successful, comprehensive marketing
plans and is the only company in the world to offer the patented iMetaDex ™ technology.",
 "thumbnailUrl": "https://www.metasensemarketing.com/default.jpg",
 "uploadDate": "2018-04-16T08:01:27Z",
 "duration": "PT4M43S",
 "embedUrl": "https://www.youtube.com/embed/0GuW_UjNZwY",
 "interactionCount": "781"
}</script>
//Microdata Virtual Reality Example
    <div itemscope itemtype="https://schema.org/Article">
      <span itemprop="name">MetaSense Marketing Management Inc.</span>
      by <span itemprop="author">Jatin V Mehta</span>
      We are a full-service digital marketing agency SEO company in New Jersey &
Philadelphia that takes pride in creating successful, comprehensive marketing plans and is
the only company in the world to offer the patented iMetaDex ™ technology.
        <div itemprop="interactionStatistic" itemscope
itemtype="https://schema.org/InteractionCounter">
          <div itemprop="interactionService" itemscope
itemid="https://twitter.com/MetaSense" itemtype="https://schema.org/WebSite">
            <meta itemprop="name" content="Twitter" />
          </div>
          <meta itemprop="interactionType" content="https://schema.org/ShareAction"/>
          <meta itemprop="userInteractionCount" content="1203" />
        </div>
        <div itemprop="interactionStatistic" itemscope
itemtype="https://schema.org/InteractionCounter">
          <meta itemprop="interactionType" content="https://schema.org/CommentAction"/>
          <meta itemprop="userInteractionCount" content="78" />
        </div>
    </div>
//RDFa Virtual Reality Example
    <div vocab="https://schema.org/" typeof="Article">
      <span property="name">MetaSense Marketing Management Inc.</span>
      by <span property="author">Jatin V Mehta</span>
      We are a full-service digital marketing agency SEO company in New Jersey &
Philadelphia that takes pride in creating successful, comprehensive marketing plans and is
the only company in the world to offer the patented iMetaDex ™ technology.
        <div property="interactionStatistic" typeof="InteractionCounter">
          <div property="interactionService" typeof="WebSite">
            <meta property="url" content="https://twitter.com/MetaSense"/>
            <meta property="name" content="Twitter" />
          </div>
          <meta property="interactionType" content="https://schema.org/ShareAction"/>
          <meta property="userInteractionCount" content="1203" />
        </div>
        <div property="interactionStatistic" typeof="InteractionCounter">
          <meta property="interactionType" content="https://schema.org/CommentAction"/>
          <meta property="userInteractionCount" content="78" />
        </div>
    </div>
```

In addition to virtual reality technology, in an embodiment, the media data optimization engine (MDOE) has applications in other technologies such as augmented reality and Web3 applications that run on blockchains and/or decentralized networks of peer-to-peer servers.

Figure 5:
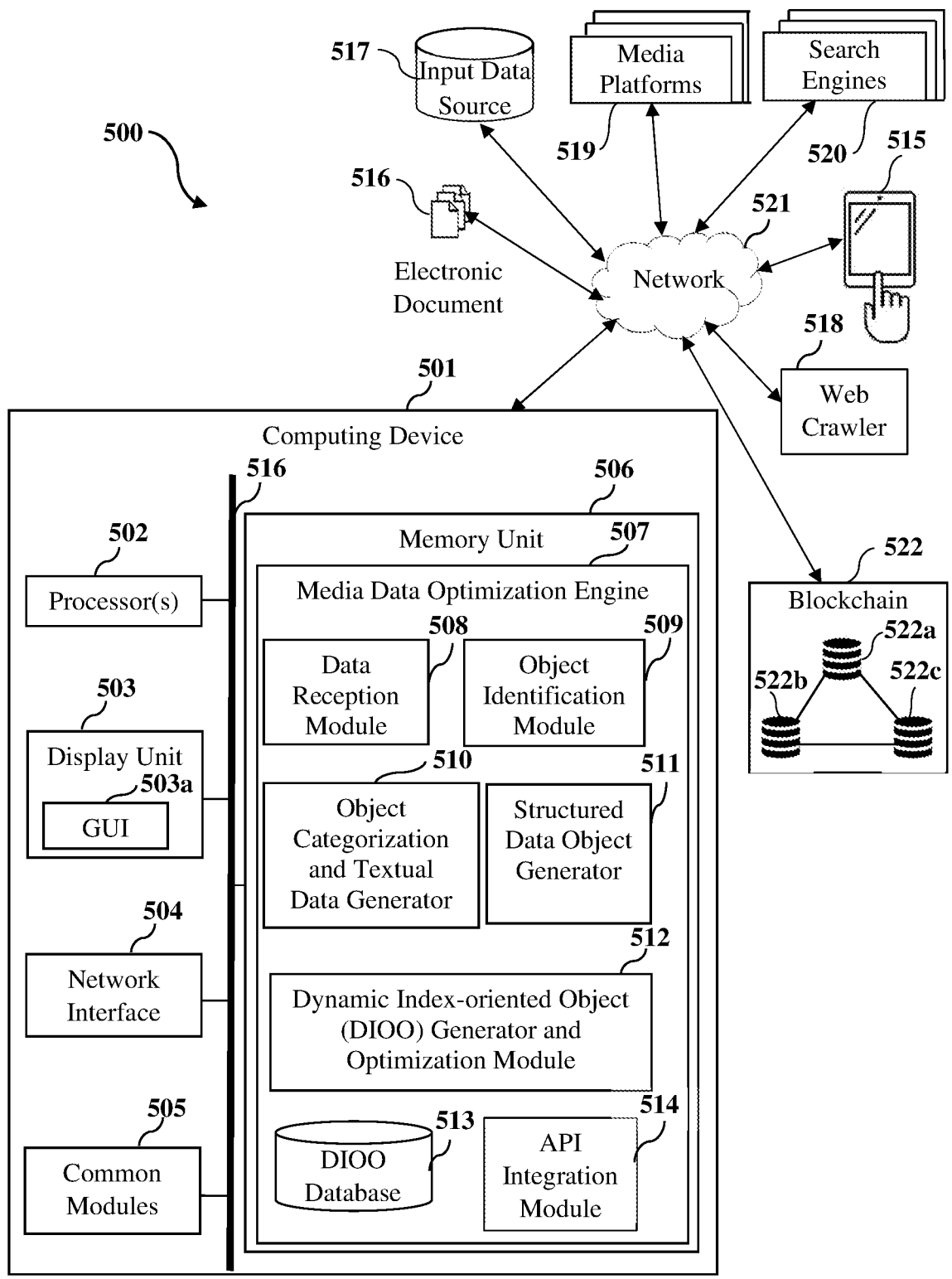
FIG. 5 illustrates an architectural block diagram of an exemplary implementation of an automated system for automatically creating structured data objects for media content rendered in one or more of multiple languages in an electronic document of a business entity and dynamically optimizing the electronic document.
Figure 6A:
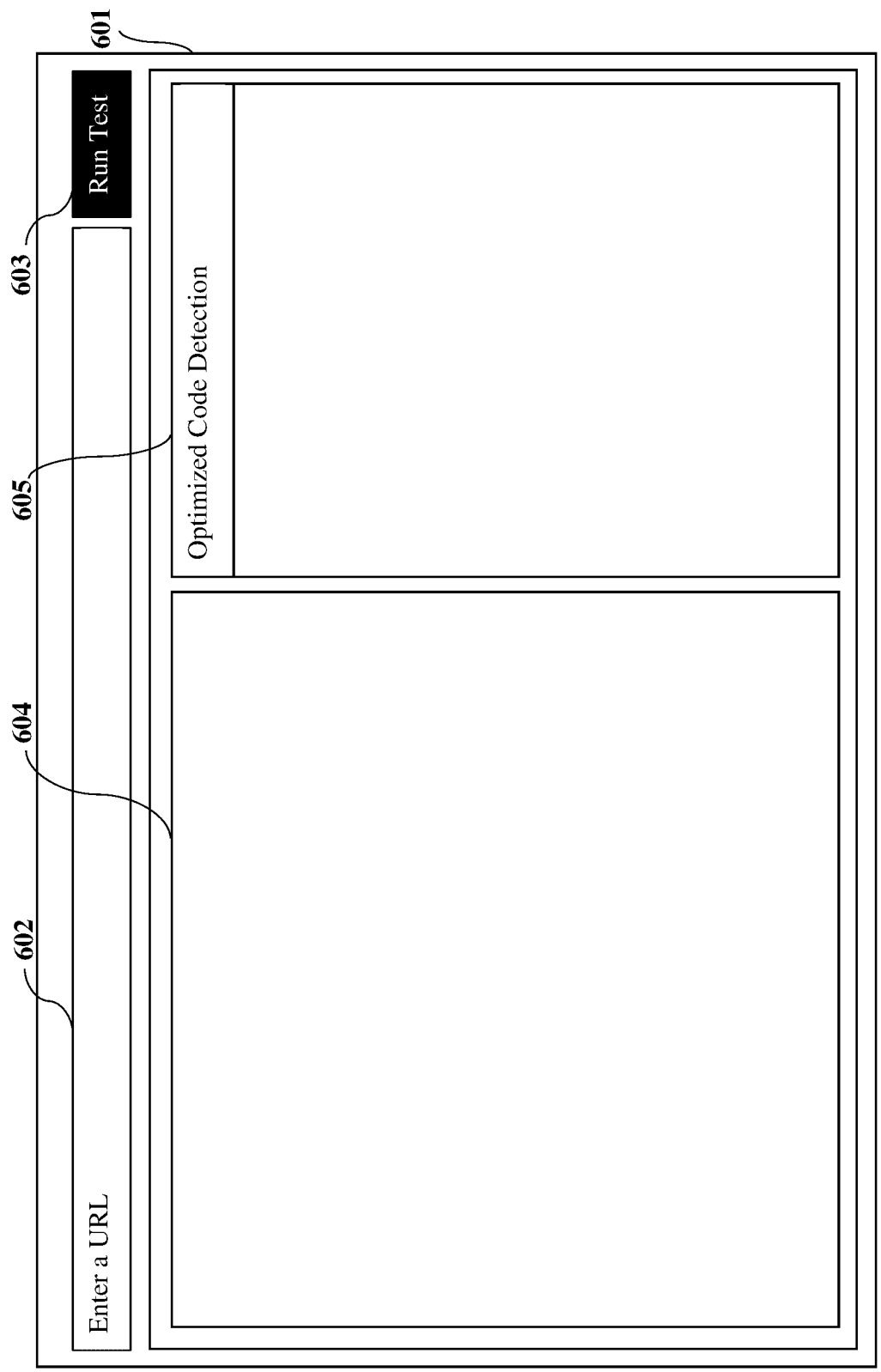
Figure 6B:
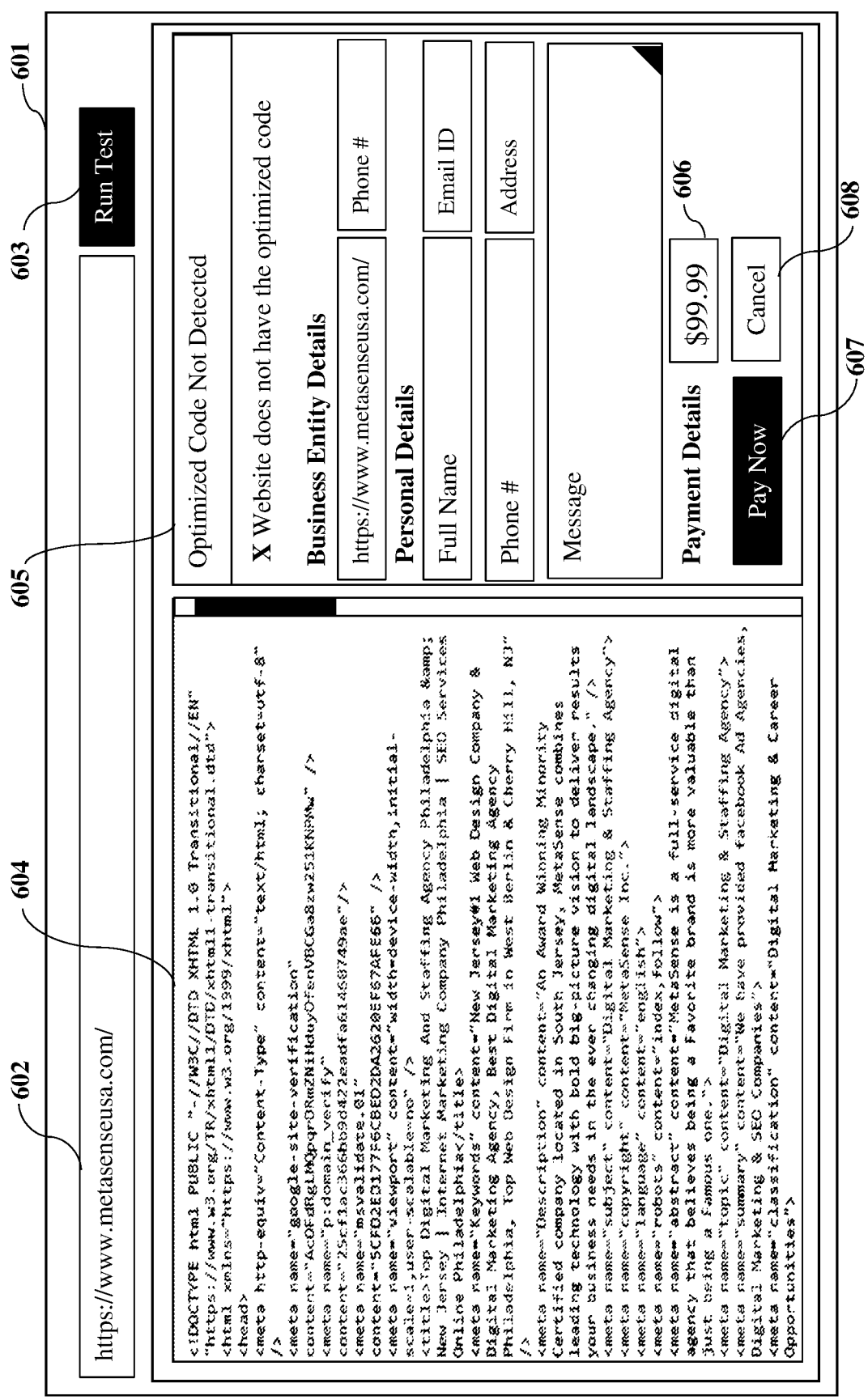
Figure 6C:
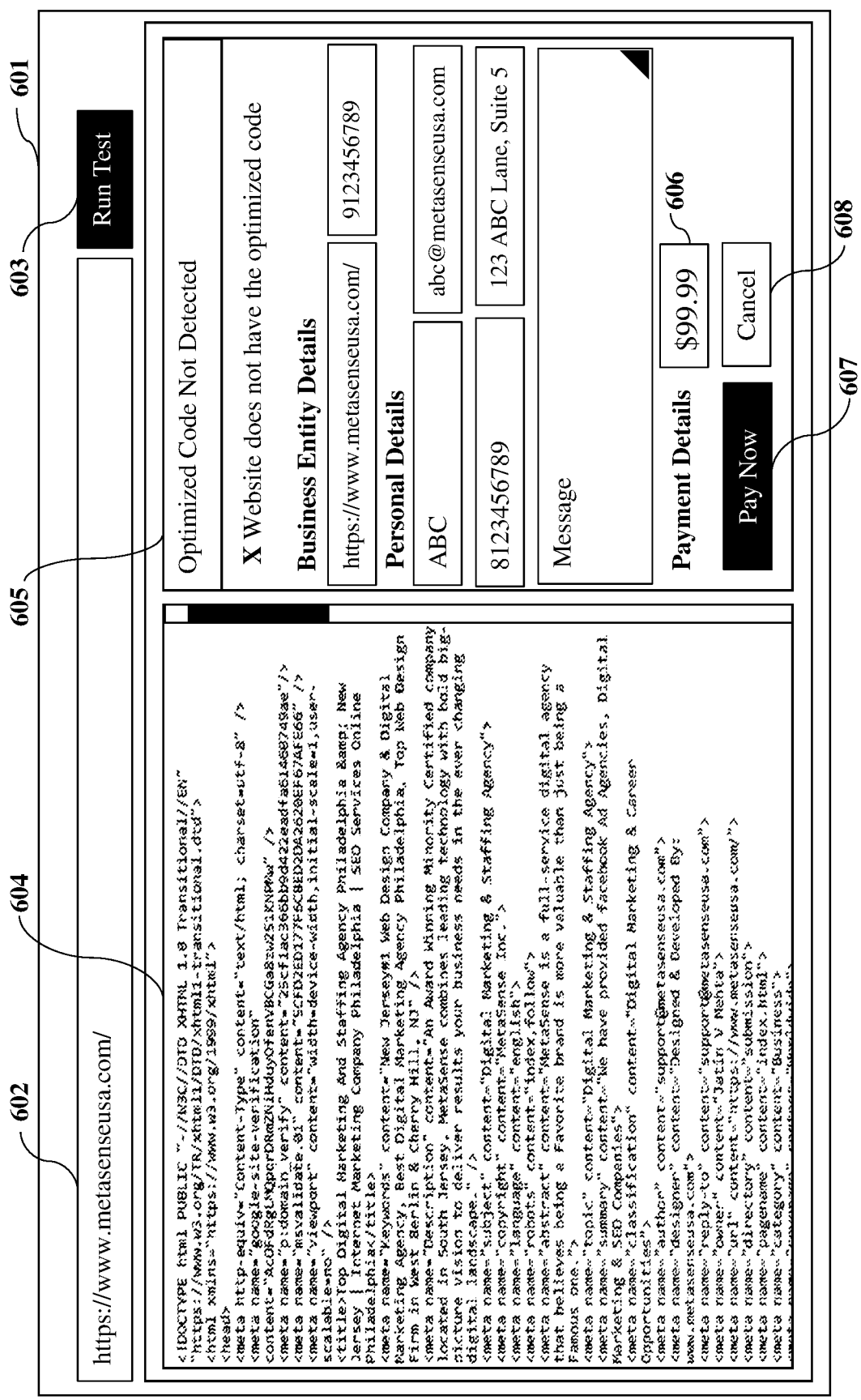
Figure 6E:
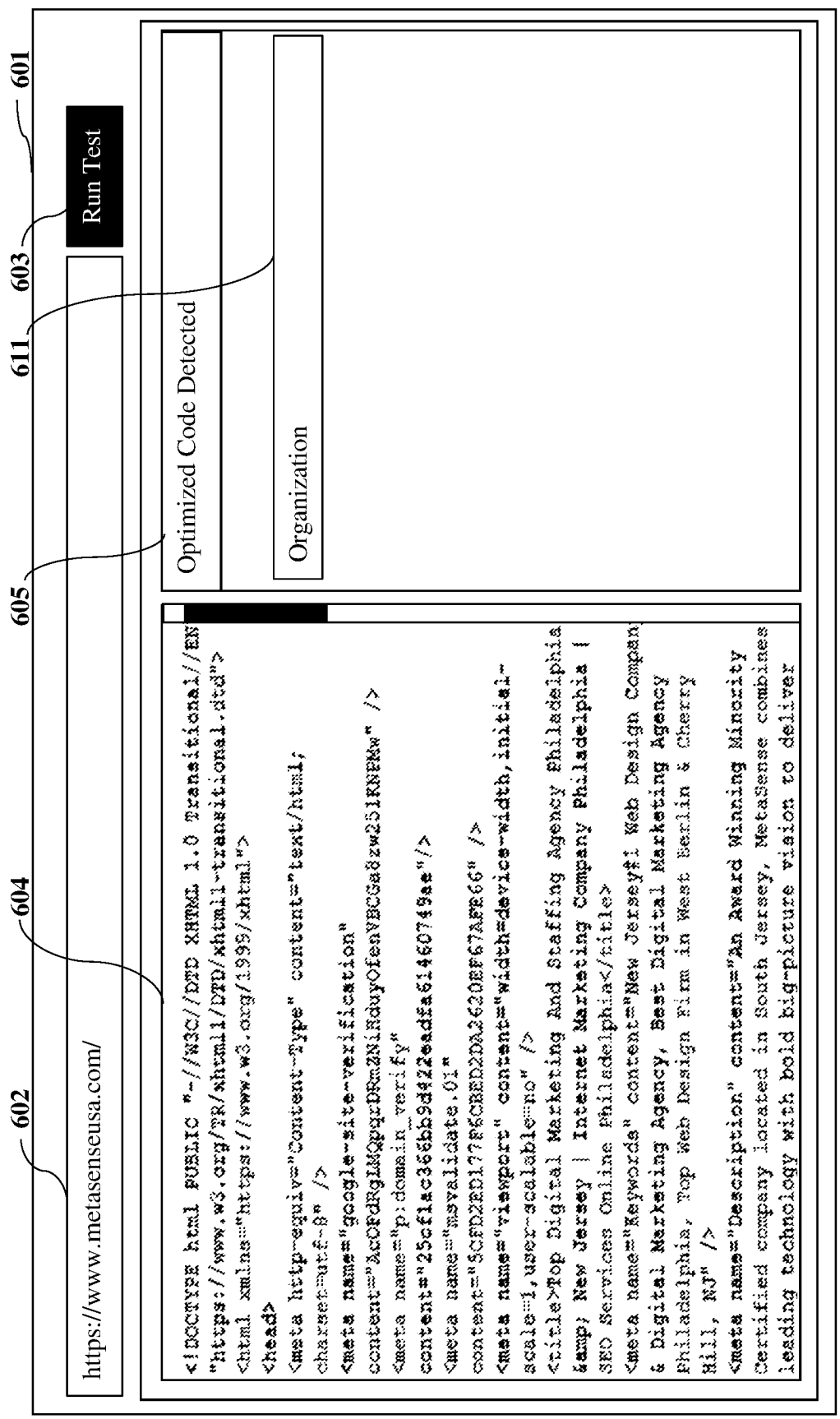

FIG. 5 illustrates an architectural block diagram of an exemplary implementation of an automated system 500 for automatically creating structured data objects for media content rendered in one or more of multiple languages in an electronic document 516, for example, a website, of a business entity and dynamically optimizing the electronic document 516. In an embodiment, the media data optimization engine (MDOE) 507 is deployed in a computing device 501 as exemplarily illustrated in FIG. 5. The computing device 501 is a computer system programmable using high-level computer programming languages. The computing device 501 is an electronic device, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a workstation, a client device, a server, a portable electronic device, a network-enabled computing device, an interactive network-enabled communication device, an image capture device, any other suitable computing equipment, combinations of multiple pieces of computing equipment, etc. In an embodiment, the MDOE 507 is implemented in the computing device 501 using programmed and purposeful hardware. In an embodiment, the MDOE 507 is a computer-embeddable system that automatically creates structured data objects for media content rendered in one or more of multiple languages in an electronic document 516 of a business entity and dynamically optimizes the electronic document 516.

The media data optimization engine (MDOE) 507 in the computing device 501 communicates with an input data source 517, a web crawler 518, search engines 520, and media platforms 519 via a network 521, for example, a short range network or a long range network. The MDOE 507 interfaces with the input data source 517, the web crawler 518, the search engines 520, and the media platforms 519 to implement the media data optimization service comprising automatic creation of structured data objects for media content rendered in one or more of multiple languages in an electronic document 516 of a business entity and dynamic optimization of the electronic document 516, and therefore more than one specifically programmed computing system is used for implementing the media data optimization service. In an embodiment, the MDOE 507 combines aspects of optimization between data crawled from the media platforms 519 with the search engines 520, for example, the Google® search engine of Google LLC, the Bing® search engine of Microsoft Corporation, the Yahoo® search engine of Yahoo! Inc., the Yandex® search engine of Yandex, Ltd., etc., to create a complete picture of the indexing capability of a uniform resource locator (URL) of the electronic document 516.

The network 521 is, for example, one of the internet, satellite internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the MDOE 507 is accessible to users, for example, through a broad spectrum of technologies and user devices 515 such as personal computers with access to the internet, internet-enabled cellular phones, tablet computing devices, etc.

In an embodiment, the media data optimization engine (MDOE) 507 is a cloud computing-based platform implemented as a service for automatically creating structured data objects for media content rendered in one or more of multiple languages in an electronic document 516 of a business entity and dynamically optimizing the electronic document 516. For example, the MDOE 507 is configured as a software as a service (SaaS) platform or a cloud-based software as a service (CSaaS) platform that automatically creates structured data objects for media content rendered in one or more of multiple languages in an electronic document 516 of a business entity and dynamically optimizes the electronic document 516. In another embodiment, the MDOE 507 is implemented as an on-premise platform comprising on-premise software installed and run on client systems on the premises of an organization.

As exemplarily illustrated in FIG. 5, the computing device 501 comprises a non-transitory, computer-readable storage medium, for example, a memory unit 506, for storing computer program instructions defined by modules, for example, 508, 509, 510, 511, 512, 513, 514, etc., of the media data optimization engine (MDOE) 507. As used herein, "non-transitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The computing device 501 further comprises at least one processor 502 operably and communicatively coupled to the memory unit 506 for executing the computer program instructions defined by the modules, for example, 508, 509, 510, 511, 512, 514, etc., of the MDOE 507. The memory unit 506 is used for storing program instructions, applications, and data. In an embodiment, the memory unit 506 is a random-access memory (RAM) or another type of dynamic storage device that stores information and instructions for execution by the processor(s) 502. The memory unit 506 also stores temporary variables and other intermediate information used during execution of the instructions by the processor 502. In an embodiment, the computing device 501 further comprises a read only memory (ROM) or other types of static storage devices that store static information and instructions for execution by the processor 502. In an embodiment, the modules, for example, 508, 509, 510, 511, 512, 513, 514, etc., of the MDOE 507 are stored in the memory unit 506.

The processor 502 is configured to execute the modules, for example, 508, 509, 510, 511, 512, 513, 514, etc., of the media data optimization engine (MDOE) 507 for automatically creating structured data objects for media content rendered in one or more of multiple languages in an electronic document 516 of a business entity and dynamically optimizing the electronic document 516. The modules, for example, 508, 509, 510, 511, 512, 513, 514, etc., of the MDOE 507, when loaded into the memory unit 506 and executed by the processor 502, transform the computing device 501 into a specially-programmed, special purpose computing device configured to implement the functionality disclosed herein. The processor 502 refers to one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 502 is implemented as a processor set comprising, for example, a programmed microprocessor and a math or graphics co-processor. The MDOE 507 is not limited to employing the processor 502. In an embodiment, the MDOE 507 employs a controller or a microcontroller.

As exemplarily illustrated in FIG. 5, the computing device 501 further comprises a data bus 516, a display unit 503, a network interface 504, and common modules 505. The data bus 516 permits communications between the components, for example, 502, 503, 504, 505, and 506 of the computing device 501. The display unit 503, via a graphical user interface (GUI) 503a, displays user interface elements such as input text fields, for example, for allowing a user to enter an identifier of the electronic document 516 such as a uniform resource locator (URL) of a website, to be optimized. In an embodiment, the media data optimization engine (MDOE) 507 renders the GUI 503a on the display unit 503 for receiving inputs from the user. The GUI 503a comprises, for example, an online web interface, a web-based downloadable application interface, a mobile-based downloadable application interface, etc.

The network interface 504 enables connection of the computing device 501 to the network 521. In an embodiment, the network interface 504 is provided as an interface card also referred to as a line card. The network interface 504 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 505 of the computing device 501 comprise, for example, input/output (I/O) controllers, input devices, output devices, fixed media drives such as hard drives, removable media drives for receiving removable media, etc. The output devices output the results of operations performed by the media data optimization engine (MDOE) 507. For example, the MDOE 507 renders the results of media data optimization, for example, the structured data objects and the dynamic index-oriented object with the linked data nodes connected to the electronic document 516, to the user of the MDOE 507 using the output devices. Computer applications and programs are used for operating the computing device 501. The programs are loaded onto fixed media drives and into the memory unit 506 via the removable media drives. In an embodiment, the computer applications and programs are loaded into the memory unit 506 directly via the network 521.

In an exemplary implementation illustrated in FIG. 5, the media data optimization engine (MDOE) 507 comprises a data reception module 508, an object identification module 509, an object categorization and textual data generator (OCTDG) 510, a structured data object generator 511, a dynamic index-oriented object (DIOO) generator and optimization module 512, and a DIOO database 513, stored in the memory unit 506 and executed by the processor 502 in the computing device 501. The data reception module 508 accesses the electronic document 516 using an identifier, for example, a uniform resource locator (URL) of the electronic document 516. In an embodiment, the data reception module 508 receives the electronic document 516 to be optimized from the input data source 517 of the business entity. The MDOE 507 receives the electronic document 516 through a direct access to files of the electronic document 516 stored at the backend or through an indirect access to the source code of the electronic document 516. For example, the MDOE 507 fetches a hypertext markup language (HTML) source code of the electronic document 516 and writes the fetched HTML source code into a log file. An example of a computer program code, for example, a hypertext preprocessor (PHP) code of the data reception module 508, executable by the processor 502 for detecting and receiving data of the electronic document 516 is provided below.

```
//Include Libraries
require("simplehtmldom/simple_html_dom.php");
function RemoveSpecialChar($str) {
    // Using str_replace( ) function
    $res = str_replace( array( '\"', '""', '{' , '}' , '[', ']' , ';', '<', '>' ), ' ', $str);
    return $res;
    }
$print_schema = '';
$present_schema = '';
$schema_not_exist = "";
$schema_not_exist_value = 1;
if(isset($_POST['check_result']) && $_POST['check_result']!='') {
$get_live_url = $_POST['website_url'];
function addhttp($url) {
   if (!preg_match("~^(?:f|ht)tps?://~i", $url)) {
       $url = "http://" . $url;
   }
   return $url;
}
$website_url = addhttp($get_live_url);
$html = file_get_html($website_url);
//Get URL Source Code
$data = file_get_contents($website_url);
$get_source_code = htmlspecialchars($data);
//Website URL Incorrect
if ($data === false || $data==4001 ) {
echo "<script>window.location.href='index.php?msg=notconfirm'</script>";
exit( );
}
```

```
$table_heading_top_space = "";
$present_schema = "";
$counting = 1;
if((!$html->find('script[type=application/ld+json]', 0))) {
    $schema_not_exist = "<div class='schema_not_exist'><i class='fa fa-times'></i>
Website Not Having iMetaDex™ Code.</div>";
        $schema_not_exist_value = 0;
}
foreach($html->find('script[type=application/ld+json]') as $schema) {
$schemas = $schema->innertext;
$arr = json_decode($schemas, true);
if(isset($arr['@graph']))
{
        $master_schema = 'Graph';
}
else {
if(isset($arr['@type']))
{
        $master_schema = $arr['@type'];
}
else {
        $master_schema = '';
}
}
$master_code = "'<tr><td colspan='2'
class='schema_heading'>".$master_schema."</td></tr>";
$present_schema .= "'<a href='#".$counting."'><div
class='separate_schema'>".$master_schema."</div></a>";
if($arr['@context']=="http://schema.org")
{
        $table_heading_top_space = "<tr><td colspan='2' height='50'> <a
name='".$counting."' id='".$counting."'></a></td></tr>";
}
foreach($arr as $key => $value) {
if (is_array($value))
{
    $get_value = '';
    //1st level array
    foreach($value as $key1 => $value1) {
    //2nd level inner array
    if (is_array($value1))
    {
    foreach($value1 as $key2 => $value2) {
    //3rd level inner array
    if (is_array($value2))
    {
    foreach($value2 as $key3 => $value3) {
            /* $get_value .= $key3." : ".$value3."<br
/>";*/
            $get_value .= $key2." : ".$key2."<br />";
    }
    }
    else {
     $get_value .= $key2." : ".$value2."<br />";
    }
    }
    }
    else {
    $remove_0 = str_replace('0', '—', $key1);
        $get_value .= $remove_0." : ".$value1."<br />";
        }
        }
    }
    else {
        $get_value = $value;
    }
    $print_schema .= $table_heading_top_space.$master_code."<tr><td class='parameters'
valign='top'>".$key . "</td><td>".$get_value."</td></tr>";
    $table_heading_top_space = "";
    $master_code = '';
}
$counting++;
}
//Clear Libraries Cache
$error_message = "";
$html->clear( );
unset($html);
}
else {
```

```
$get_source_code = '';
$website_url = '';
}
```

The object identification module 509 searches for objects in the electronic document 516 and identifies non-textual objects comprising media content rendered in one or more of multiple languages in the electronic document 516. An example of a computer program code of the object identification module 509 executable by the processor 502 for identifying non-textual objects in the electronic document 516 is provided below.

```
//Include Libraries
require("simplehtmldom/simple_html_dom.php");
function RemoveSpecialChar($str) {
// Using str_replace( ) function
$res = str_replace( array( '\'' '"', '{' , '}' , '[', ']' , ';', '<', '>' ), ' ', $str);
return $res;
}
$print_schema = '';
$present_schema = '';
$schema_not_exist = " ";
$schema_not_exist_value = 1;
$imetadex_detect = "";
if(isset($_POST['check_result']) && $_POST['check_result']!='') {
$create_url = $_POST['website_ssl'].$_POST['website_url'];
$get_live_url = $create_url;
function addhttp($url) {
   if (!preg_match("~^(?:f|ht)tps?://~i", $url)) {
      $url = "http://" . $url;
   }
   return $url;
}
$website_url = addhttp($get_live_url);
      $html = file_get_html($website_url);
if((!$html-
>find('script[src=https://www.imetadex.com/single/imetadex.js?partnerid='.$client_id.']',
0)))
      {
         $html = file_get_html($website_url);
      }
      else {
         $html = str_get_html($db_print_schema);
      }
      /*Check url added on website*/
   }
else {
      $db_print_schema = " ";
      $html = file_get_html($website_url);
}
$data = file_get_contents($website_url);
$get_source_code = htmlspecialchars($data);
$codeicon = '<i class="fa fa-code" aria-hidden="true"></i>';
//Website URL Incorrect
if ($data === false || $data==4001 ) {
echo "<script>window.location.href='tool.php?msg=notconfirm'</script>";
exit( );
}
$table_heading_top_space = " ";
$present_schema = " ";
$counting = 1;
if((!$html->find('script[type=application/ld+json]', 0))) {
   $schema_not_exist = "<div class='schema_not_exist'><i class='fa fa-times'></i>
Website Not Having iMetaDex™ Code.</div>";
      $schema_not_exist_value = 0;
      $imetadex_detect = "iMetaDex™ Not Found";
}
else {
      $imetadex_detect = "iMetaDex™ Detected";
}
foreach($html->find('script[type=application/ld+json]') as $schema) {
$schemas = $schema->innertext;
$arr = json_decode($schemas, true);
if(isset($arr['@graph']))
{
      $master_schema = 'Graph';
}
else {
if(isset($arr['@type']))
```

-continued

```
{
    $master_schema = $arr['@type'];
}
else {
    $master_schema = '';
}
}
foreach($arr as $key => $value) {
    if (is_array($value))
    {
      $get_value = '';
      //1st level array
      foreach($value as $key1 => $value1) {
        //2nd level inner array
        if (is_array($value1))
        {
        foreach($value1 as $key2 => $value2) {
        //3rd level inner array
        if (is_array($value2))
        {
        foreach($value2 as $key3 => $value3) {
          /* $get_value .= $key3." : ".$value3."<br />";*/
          $get_value .= $key2." : ".$key2."<br />";
        }
        }
        else {
          $get_value .= $key2." : ".$value2."<br />";
        }
        }
        }
        else {
        $remove_0 = str_replace('0', '—', $key1);
        $get_value .= $remove_0." : ".$value1."<br />";
        }
        }
    }
    else {
        $get_value = $value;
    }
    $print_schema .= $table_heading_top_space.$master_code."<tr><td
class='parameters' valign='top'>".$key . "</td><td>".$get_value."</td></tr>";
    $table_heading_top_space = "";
    $master_code = '';
}
$counting++;
}
//Clear Libraries Cache
$error_message = "",
$html->clear( );
unset($html);
}
else {
    $get_source_code = '';
    $website_url = '';
    $codeicon = '';
}
```

The object categorization and textual data generator (OCTDG) 510 generates textual objects in the corresponding language(s) from the identified non-textual objects as follows. The OCTDG 510 categorizes the non-textual objects identified by the object identification module 509 into media categories, for example, an image category, an audio category, a video category, an animation category, a multimedia category, etc., and any combination thereof. The OCTDG 510 analyzes the identified non-textual objects in each of the media categories based on characteristics of the identified non-textual objects. The OCTDG 510 generates transcripts and/or closed captions (CCs) in the corresponding language(s) for the identified non-textual objects in the media categories as disclosed in the descriptions of FIGS. 2-3. The OCTDG 510 translates the transcripts and/or the closed captions of the identified non-textual objects in the media categories into textual objects in the corresponding language(s). The OCTDG 510 analyzes the textual objects in the corresponding language(s) with market data, for example, geographical data, local data, image data, keyword search data, etc., and any combination thereof, specific to the business entity, for optimizing and increasing accuracy of the textual objects in the corresponding language(s). The structured data object generator 511 transforms the generated textual objects in the corresponding language(s) into structured data objects based on configurable criteria comprising, for example, templates, content derived from the electronic document 516, content derived from the generated textual objects in the corresponding language(s), structured data markup schemas, best practices associated with schemas to suit multiple linked data object categories, etc., and any combination thereof. In an embodiment, in addition to the non-textual objects, the structured data object generator 511 transforms textual objects found in the electronic document 516 during a search for objects in the electronic document 516 into structured data objects based on the configurable criteria. In an embodiment, the structured data object generator 511 generates the structured data objects using an artificial intelligence (AI)-based transformation of the textual objects in the corresponding language(s).

The dynamic index-oriented object (DIOO) generator and optimization module 512 generates a dynamic index-oriented object for the structured data objects specific to the business entity. In an embodiment, the DIOO generator and optimization module 512 stores the structured data objects in the DIOO database 513. The DIOO database 513 is any storage area or medium that can be used for storing the structured data objects. In an embodiment, the DIOO database 513 is any of a structured query language (SQL) database or a not only SQL (NoSQL) database. In an embodiment, the DIOO database 513 is a location on a file system. In another embodiment, the DIOO database 513 is configured to be remotely accessible by the media data optimization engine (MDOE) 507 in the computing device 501 via the network 521. In another embodiment, the DIOO database 513 is configured as a cloud-based database implemented in a cloud computing environment. The DIOO generator and optimization module 512 connects the structured data objects to the dynamic index-oriented object by creating linked data nodes, for example, JavaScript Object Notation for Linked Data (JSON-LD) nodes, from the structured data objects with the dynamic index-oriented object as a core. The DIOO generator and optimization module 512 connects the dynamic index-oriented object with the linked data nodes to the electronic document 516, thereby facilitating dynamic changes to the electronic document 516 and dynamically optimizing the electronic document 516. The DIOO generator and optimization module 512 facilitates the dynamic changes to the electronic document 516 free of recreation of the structured data objects using the linked data nodes of the dynamic index-oriented object. The DIOO generator and optimization module 512 connects the dynamic index-oriented object with the linked data nodes to the electronic document 516, for example, using an application programming interface (API) key. In an embodiment, in response to a search query, the DIOO generator and optimization module 512 fits one or more of the linked data nodes of the dynamic index-oriented object to the search query.

In an embodiment, the media data optimization engine (MDOE) 507 further comprises an application programming interface (API) integration module 514 for connecting the dynamic index-oriented object with the linked data nodes to the electronic document 516. In another embodiment, the API integration module 514 integrates the MDOE 507 with APIs of multiple search engines 520 and/or multiple media platforms 519. The API integration module 514 implements API key integration for accessing the APIs of the search engines 520 and the media platforms 519 as disclosed in Applicant's patent titled "Content Validation and Coding for Search Engine Optimization" with Ser. No. 15/834,228, issued as U.S. Pat. No. 10,698,960. Using API key integration, the API integration module 514 fetches data, for example, product details and other information available on the API such as name, price, description, etc., using, for example, a client uniform resource locator (cURL) tool or other methods to post into the structured data objects. An example code illustrating the API key integration is disclosed below.

```
<?php
$url = "https://api.example.com/api/v2/list/4707689/leads";
$curl = curl_init($url);
curl_setopt($curl, CURLOPT_URL, $url);
curl_setopt($curl, CURLOPT_RETURNTRANSFER, true);
$headers = array(
    "X-Access-Key: 7775123456YRTVkn9EhohfPrIjt2d87FpPpJIaRDkt",
    "Content-Type: application/json",
);
curl_setopt($curl, CURLOPT_HTTPHEADER, $headers);
//for debug only!
curl_setopt($curl, CURLOPT_SSL_VERIFYHOST, false);
curl_setopt($curl, CURLOPT_SSL_VERIFYPEER, false);
$resp = curl_exec($curl);
curl_close($curl);
//var_dump($resp);
echo "<pre>$resp</pre>";
?>
```

In an embodiment, the media data optimization engine (MDOE) 507 implements blockchain technology and protocols that utilize, for example, JavaScript Object Notation for Linked Data (JSON-LD), for executing the various analyses disclosed above in a secure, shared, and decentralized environment, and thereafter connecting the created structured data objects to the dynamic index-oriented object. In an embodiment, the application programming interface (API) integration module 514 implements a secure API connection with the electronic document 516 of the business entity through a blockchain 522 comprising multiple nodes 522a, 522b, and 522c in a decentralized environment to establish a secure connection and data transactions between the dynamic index-oriented object (DIOO) database 513 and the electronic document 516. The MDOE 507 communicates with the blockchain 522 via the network 521. The blockchain 522 is implemented as a distributed database that maintains a continuously growing list of records called blocks used for performing multiple functions in dynamically optimizing the electronic document 516. The API integration module 514 provides an API for blockchain development to provide added security during coding of the electronic document 516 for search engine optimization. The blockchain 522 creates an ordered, back-linked list of blocks, which are linked and secured using cryptography. A mathematical notation referred as a "hash" identifies each block and links back to the previous block. The sequences of hashes linking each block create a chain where any changes made to a block will change the hash of that block, which is recomputed and stored in the next block. This changes the hash of the next block, which is also recomputed and so on until the end of the chain. The automated system 500 implements the blockchain 522 in a distributed network. The blockchain 522 provides a secure interface between the DIOO database 513 and the electronic document 516 to allow the MDOE 507 to implement coding of the electronic document 516 using the determined optimal schema codes. In an embodiment, the blocks in the blockchain 522 implemented by the MDOE 507 are hypertext markup language (HTML) coding updates that are transferred from the MDOE 507 to the electronic document 516. The blockchain 522 adds security in coding the electronic document 516.

The processor 502 retrieves instructions defined by the data reception module 508, the object identification module 509, the object categorization and textual data generator 510, the structured data object generator 511, the dynamic index-oriented object (DIOO) generator and optimization module 512, and the API integration module 514 from the memory unit 506 for executing the respective functions disclosed above. The data reception module 508, the object identification module 509, the object categorization and textual data generator 510, the structured data object generator 511, the DIOO generator and optimization module 512, and the API integration module 514 of the media data optimization engine (MDOE) 507 are disclosed above as software executed by the processor 502. In an embodiment, the modules, for example, 508, 509, 510, 511, 512, 513, 514, etc., of the MDOE 507 are implemented completely in hardware. In another embodiment, the modules, for example, 508, 509, 510, 511, 512, 513, 514, etc., of the MDOE 507 are implemented by logic circuits to carry out their respective functions disclosed above. In another embodiment, the MDOE 507 is also implemented as a combination of hardware and software and one or more processors, for example, 502, that are used to implement the modules, for example, 508, 509, 510, 511, 512, 513, 514, etc., of the MDOE 507.

For purposes of illustration, the disclosure herein refers to the modules, for example, 508, 509, 510, 511, 512, 513, 514, etc., of the media data optimization engine (MDOE) 507 being run locally on a single computing device 501; however the scope of the automated system 500 and the method disclosed herein is not limited to the modules, for example, 508, 509, 510, 511, 512, 513, 514, etc., of the MDOE 507 being run locally on a single computing device 501 via the operating system and the processor(s) 502, but extends to running the modules, for example, 508, 509, 510, 511, 512, 513, 514, etc., of the MDOE 507 remotely over the network 521 by employing a web browser and a remote server, a mobile phone, or other electronic devices. In an embodiment, one or more portions of the automated system 500 disclosed herein are distributed across one or more computer systems (not shown) coupled to the network 521.

The non-transitory, computer-readable storage medium disclosed herein stores computer program instructions executable by the processor 502 for automatically creating structured data objects for media content rendered in one or more of multiple languages in an electronic document 516 of a business entity and dynamically optimizing the electronic document 516. The computer program instructions implement the processes of various embodiments disclosed above and perform additional steps that may be required and contemplated for automatically creating structured data objects for media content rendered in one or more of multiple languages in an electronic document 516 of a business entity and dynamically optimizing the electronic document 516. When the computer program instructions are executed by the processor(s) 502, the computer program instructions cause the processor(s) 502 to perform the steps of the method for automatically creating structured data objects for media content rendered in one or more of multiple languages in an electronic document 516 of a business entity and dynamically optimizing the electronic document 516 as disclosed in the descriptions of FIGS. 1-4. In an embodiment, a single piece of computer program code comprising computer program instructions performs one or more steps of the method disclosed in the descriptions of FIGS. 1-4. The processor(s) 502 retrieves these computer program instructions and executes them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, C, C++, C#, Java®, JavaScript®, Fortran, Ruby, Perl®, Python®, Visual Basic®, hypertext preprocessor (PHP), Microsoft® .NET, Objective-C®, Hadoop® of the Apache Software Foundation, the Solidity contract oriented programming language, Lisp, ArcGIS® of Environmental Systems Research Institute, Inc., etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

The automated system 500 comprising the media data optimization engine (MDOE) 507 and the method disclosed herein provide an improvement in search engine optimization (SEO) computer related technology. In the automated system 500 and the method disclosed herein, the design and the flow of interactions between the MDOE 507, the input data source 517, the web crawler 518, the collaborative schema data source(s), the search engines 520, the media platforms 519, and the user devices 515 are deliberate, designed, and directed. Every uniform resource locator (URL) of the electronic document 516, received by the MDOE 507 via a user interface such as a graphical user interface (GUI) 503a provided by the MDOE 507, is configured by the MDOE 507 to steer the URL towards a finite set of predictable outcomes. The MDOE 507 implements one or more specific computer programs to direct the URL towards a set of end results. The interactions designed by the MDOE 507 allow the MDOE 507 to identify non-textual objects comprising media content rendered in one or more of multiple languages in the electronic document 516 identified by the URL; generate textual objects in the corresponding language(s) from the identified non-textual objects; transform the generated textual objects in the corresponding language(s) into structured data objects based on configurable criteria; and from these structural data objects, through the use of other, separate and autonomous computer programs, generate a dynamic index-oriented object for the structured data objects specific to the business entity; connect the structured data objects to the dynamic index-oriented object by creating linked data nodes from the structured data objects with the dynamic index-oriented object as a core; and connect the dynamic index-oriented object with the linked data nodes to the electronic document 516, thereby facilitating dynamic changes to the electronic document 516 and dynamically optimizing the electronic document 516. This automatic creation of the structural data objects and connection of the dynamic index-oriented object with the linked data nodes to the electronic document 516 are used as triggers to code the electronic document 516 and facilitate dynamic changes to the electronic document 516 for dynamically optimizing the electronic document 516 for search engine optimization. To perform the above disclosed method steps requires seven or more separate computer programs and subprograms, the execution of which cannot be performed by a person using a generic computer with a generic program.

FIGS. 6A-6E exemplarily illustrate screenshots of graphical user interfaces (GUIs) 601 and 609 rendered by the media data optimization engine (MDOE) for automatically creating structured data objects for media content rendered in one or more of multiple languages in an electronic document, for example, a website, of a business entity and dynamically optimizing the electronic document. Consider an example where a website of a business entity identified by a uniform resource locator (URL), www.metasenseusa.com, is to be optimized by the MDOE. The MDOE renders a graphical user interface (GUI) 601 comprising an input field 602 for entering the URL of the website as exemplarily illustrated in FIG. 6A. The GUI 601 further comprises fields 604 and 605 for displaying a source code of the website and notifications and other information of the business entity. A user associated with the business entity inputs the URL "www.metasenseusa.com" into the input field 602 on the GUI 601 as exemplarily illustrated in FIG. 6B, and clicks a "Run Test" button 603 provided on the GUI 601.

The media data optimization engine (MDOE) accesses the website using the URL of the website. In an embodiment, the MDOE executes the web crawler 518 exemplarily illustrated in FIG. 5, to crawl the URL and access the website. The web crawler 518 crawls, parses, and indexes objects comprising textual content and media content, for example, image content, audio content, video content, animation content, multimedia content, etc., and any combination thereof, on the website. The MDOE fetches and displays the hypertext markup language (HTML) source code of the website in the field 604 on the GUI 601 as exemplarily illustrated in FIG. 6B. On accessing the website and analyzing the source code of the website, the MDOE determines whether the website is optimized with structured data objects. If the website is optimized with the structured data objects, the MDOE displays the optimized code of the website on the GUI 601. On determining that the website is not optimized, the MDOE displays a notification that the optimized code is not detected in the field 605 as exemplarily illustrated in FIG. 6B, and provides an option to optimize the website. In an embodiment, the MDOE provides an option to optimize the website for a fee. In this embodiment, the GUI 601 displays the fee to be paid in a field 606 on the GUI 601 and provides control elements, for example, control buttons "Pay Now" 607 and "Cancel" 608 as exemplarily illustrated in FIG. 6B, to proceed with the payment or the cancelation of the media data optimization service provided by the MDOE. If the user decides to proceed with the media data optimization service provided by the MDOE, the user enters details of the business entity in the field 605 on the GUI 601 and clicks on the control button "Pay Now" 607 as exemplarily illustrated in FIG. 6C. The MDOE processes the payment and after successful payment confirmation, the MDOE proceeds to optimize the website.

The media data optimization engine (MDOE) searches objects in the website and identifies textual objects and non-textual objects comprising media content rendered in one or more of multiple languages in the website. The MDOE generates textual objects in the corresponding language(s) from the identified non-textual objects as disclosed in the descriptions of FIGS. 2-3. The MDOE transforms the generated textual objects in the corresponding language(s) into structured data objects based on configurable criteria comprising, for example, templates, content derived from the website, content derived from the generated textual objects in the corresponding language(s), structured data markup schemas, best practices associated with schemas to suit multiple linked data object categories, etc., and any combination thereof as disclosed in the descriptions of FIG. 1 and FIG. 4. In an embodiment, the MDOE configures the structured data objects, for example, with hypertext markup language (HTML) markups that can be integrated into the website. In an embodiment, in addition to the non-textual objects, the MDOE transforms textual objects found in the website during a search for objects in the website into structured data objects based on the configurable criteria.

The media data optimization engine (MDOE) generates a dynamic index-oriented object for the structured data objects specific to the business entity. The dynamic index-oriented object configures the structured data objects based on requirements of the business entity's website to be read by web resources, for example, search engines, social networks, databases such as JavaScript Object Notation (JSON) databases, etc. In an embodiment, the MDOE stores the structured data objects in the dynamic index-oriented object database. The MDOE connects the structured data objects to the dynamic index-oriented object by creating linked data nodes, for example, JavaScript Object Notation for Linked Data (JSON-LD) nodes, from the structured data objects with the dynamic index-oriented object as a core. The MDOE connects the dynamic index-oriented object with the linked data nodes to the website, thereby facilitating dynamic changes to the website and dynamically optimizing the website as disclosed in the descriptions of FIG. 1 and FIG. 4. On completing the optimization of the website, the MDOE renders a confirmation of the payment and optimization of the website to the user on the GUI 609 as exemplarily illustrated in FIG. 6D. The MDOE also renders the output optimized script, for example, as a JavaScript code, to be pasted at the end of each webpage of the business entity's website. For example, the MDOE renders the following script in an output field 610 on the GUI 609 as exemplarily illustrated in FIG. 6D:

```
"<script src="https://metasensemarketing.com/imetadextool/schema/imetadex_1629101304.js"></script>"
```

In an embodiment, the media data optimization engine (MDOE) instructs the user to insert the optimized script into a header file and/or a footer file of the website to allow the MDOE to verify the authenticity of the business entity. After the script is implemented in the business entity's website, the user may verify the implementation by re-entering the URL of the website in the input field 602 on the GUI 601 and clicking the "Run Test" button 603 provided on the GUI 601 as exemplarily illustrated in FIG. 6E. In response, the media data optimization engine (MDOE) confirms the implementation by displaying a notification "Optimized Code Detected" in the field 605 on the GUI 601 as exemplarily illustrated in FIG. 6E. The field 605 displays a representation 611 of the structured data object automatically created for "Organization" defining the business entity as exemplarily illustrated in FIG. 6E. When a search engine receives a search query related to the business entity, the MDOE fits one or more of the linked data nodes of the dynamic index-oriented object connected to the website to the search query.

In an embodiment, the media data optimization engine (MDOE) scans the JavaScript Object Notation (JSON) code of the website. When the MDOE receives the URL of the website, the MDOE searches for the presence of a script tag, for example, <script type="application/ld+json"> on each webpage of the website. On identifying the script tag, the MDOE retrieves parameters and fetches schema codes of the webpage. In an example, on identifying the presence of media files in the JSON code during the analysis of the JSON code, the MDOE determines whether the tag associated with the media file is an audio tag or a video tag, and accordingly, fetches schema codes for the audio object or the video object, creates a structured data object for the audio object or the video object by applying the corresponding schema code to the audio object or the video object, and connects the structured data object to the website's profile defined by the dynamic index-oriented object. In an embodiment, during the analysis of the objects identified in the website, the MDOE determines the category of the website, for example, restaurant, sports, satellite communication, etc., by executing an artificial intelligence (AI) algorithm. The MDOE determines optimal schema codes for the website. The MDOE retrieves data, for example, a title indicated by a hypertext markup language (HTML) tag such as h1, description, etc., related to the website from a backend code of the website and introduces the retrieved data into an optimized code, for example, a JSON code, for the website. The optimized code comprises the retrieved data and the optimal schema codes recommended by the MDOE for the website. The MDOE then renders a line of JSON code to be entered in a header file or a footer file of the website for executing the optimal schema codes across the webpages, for example, a home page, an "about us" page, etc., of the website.

In addition to coding the website by tagging the website as a business and the products and the services provided by the business, during the automatic creation of the structured data objects, in an embodiment, the media data optimization engine (MDOE) applies optimal schema codes to relevant content, for example, articles, blogs, reviews, person content, images, videos, audio content, animations, etc., and any combination thereof, in the website. In an embodiment, the MDOE also creates keyword related content of the business entity and the keyword related content that describes topics of which the business entity is a part and the interests of the business entity. The keyword related content with the optimal schema codes improves the user, usage, and traffic or query data. The content in the website offers text for the website's visitors to read and by offering the text on a regular consistent basis, the MDOE increases search engine optimization and search rankings of the business entity. The MDOE automatically creates the structured data objects for the media content of the website to allow the search engines to index the media content optimally. The MDOE ensures that relevant and valid content is positioned in the website to be indexed optimally, thereby enhancing search engine optimization when backlinks link to this content. In an embodiment, the MDOE adds backlinks to the coded content through the media platforms.

The media data optimization engine (MDOE) executes the heuristically-based coded algorithm that automatically analyzes, classifies, and then recodes the website for search engine optimization. During the automatic creation of the structured data objects, the MDOE applies optimal schema codes and item properties to the right media content on each webpage of the website by identifying which piece of media content on the webpage benefits from the optimal schema codes. For example, the MDOE codes a website of a business entity to allow search engines to index the website when media content is posted on the website. The MDOE provides control over the search results. The coding of the media content of different types and combinations in the website with the optimal schema codes by the MDOE, which automatically creates the structured data objects and in turn the dynamic index-oriented object with its linked data nodes, shapes the information the listings display on a search engine results page, thereby providing instructions on the media content of the website and the method of indexing the media content of the website to the search engines. By adding the optimal schema codes to new media content, for example, articles, blogs, videos, podcasts, etc., posted on websites, the MDOE makes that media content easier to index. The MDOE structures the media content of the website to be keyword strong and follows best practices of search engine optimization for easier and efficient web crawling. In an embodiment, the MDOE applies the determined optimal schema codes directly to the coding of a website. In an embodiment, if the received electronic document, for example, the website is integrated with the application programming interface (API) key provided by the MDOE, then the MDOE allows users to initiate code changes onto the hypertext markup language (HTML) code of the website.

The media data optimization engine (MDOE) utilizes the optimal schema codes to improve the optimization of the website. The optimal schema codes in the content of the website, with the keyword strong quality and with the search engine optimization best practices, improve page-level link features and domain-level link authority features of the website. The page-level link features define the quality and quantity of links aimed at a single webpage of the website. The domain-level link authority features define the quality and quantity of links aimed at the entire website. The improvement in the page-level link features and the domain-level link authority features of the website facilitates enhanced ranking of the website on a search engine result page. Coding of the validated content of the website comprising, for example, keyword relevant content such as a piece of creative work or an article, video content, audio content, etc., and ongoing content native to a website, with the determined optimal schema codes by the MDOE improves user, usage, and traffic or query data, the page level, keyword-agnostic features, and page level keyword and content features of the website.

The focus of the automated system and the method disclosed herein is on an improvement to search engine optimization and structured data, computer related functionality itself, and not on economic or other tasks for which a generic computer is used in its ordinary capacity. Accordingly, the automated system and the method disclosed herein are not directed to an abstract idea. Rather, the automated system and the method disclosed herein are directed to a specific improvement to the way the computing system of the MDOE operates, embodied in, for example, accessing an electronic document using an identifier of the electronic document; identifying non-textual objects comprising media content rendered in one or more of multiple languages in the electronic document; generating textual objects in the corresponding language(s) from the identified non-textual objects; transforming the generated textual objects in the corresponding language(s) into structured data objects based on configurable criteria; generating a dynamic index-oriented object for the structured data objects specific to the business entity; connecting the structured data objects to the dynamic index-oriented object by creating linked data nodes from the structured data objects with the dynamic index-oriented object as a core; and connecting the dynamic index-oriented object with the linked data nodes to the electronic document, thereby facilitating dynamic changes to the electronic document and dynamically optimizing the electronic document. Instead of mere code, the MDOE creates structured data objects based on the analysis of the website, which goes beyond rich snippets by creating a multi-dimensional object, namely, the dynamic index-oriented object, that can be identified and understood beyond typical rich snippets.

The media data optimization engine (MDOE) of the automated system and the method disclosed herein automatically creates structured data objects for media content rendered in one or more languages in an electronic document of a business entity, which drives business results, increases organic web traffic on search engines, increases domain authority and page authority, reduces pay-per-click (PPC) cost, improves a brand's "find ability" in searches, controls how the brand appears in search results, improves find ability on multiple platforms, for example, mobile platforms, desktop platforms, voice platforms, etc., obtains return on investment (ROI) from events, courses, articles, audio, videos, etc., rendered on the business entity's website, attracts job applicants, improves content readability, provides optimal customer services in terms of providing answers to frequently asked questions (FAQs) in searches, derives enhanced insights from analytics, indexes content fast, etc. Furthermore, the automatically created structured data objects and dynamic optimization of the business entity's website render rich results for products and services of the business entity, which increase click-through rates (CTRs) and draw more attention to listings of the business entity having positive reviews. Rendering rich results for products and services also increases conversion rates, because when more users view the business entity's listings and the listings are positive, the likelihood that the users will buy from the business entity increases. Furthermore, the more clicks generated lead to an increase in an organic ranking position for relevant search queries. This increase in the organic ranking position also relates to user expectations being met. The automatically created structured data objects help websites appear in a semantic network or a knowledge base of search engine providers, for example, Google's Knowledge Graph.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the embodiments disclosed herein are implemented as programmed elements, or non-programmed elements, or any suitable combination thereof.

Where databases are described such as the dynamic index-oriented object database 513 exemplarily illustrated in FIG. 5, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, satellite internet, a local area network (LAN), a wide area network (WAN) or the Ethernet, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

We claim:

1. A system comprising:
   at least one processor;
   a non-transitory, computer-readable storage medium operably and communicatively coupled to the at least one processor and configured to store computer program instructions executable by the at least one processor; and
   a media data optimization engine defining the computer program instructions, which when executed by the at least one processor, cause the at least one processor to:
   access a media-based multilanguage electronic document of a business entity using an identifier of the multilanguage electronic document, wherein the media-based multilanguage electronic document is one of a media-based multilanguage website and a webpage of the media-based multilanguage website;
   individually execute below steps in a language that corresponds to each natural language identified in the media-based multilanguage electronic document:
      identify non-textual objects rendered in each of the multiple natural languages in the media-based multilanguage electronic document;
      categorize the identified non-textual objects in each of the multiple natural languages in the media-based multilanguage electronic document into media categories;
      analyze the identified non-textual objects in each of the media categories in each of the multiple natural languages in the media-based multilanguage electronic document based on characteristics of the identified non-textual objects;
      generate transcripts and closed captions in each of the multiple natural languages in the media-based multilanguage electronic document for the identified non-textual objects in the media categories;
      transform the transcripts and the closed captions of the identified non-textual objects in the media categories into the textual objects in each of the multiple natural languages in the media-based multilanguage electronic document;
      analyze the textual objects directly derived from each of the multiple natural languages in the media-based multilanguage electronic document and the textual objects derived from the identified non-textual objects in each of the multiple natural languages in the media-based multilanguage electronic document with market data specific to the business entity for optimizing the textual objects directly derived from each of the multiple natural languages in the media-based multilanguage electronic document and the textual objects derived from the identified non-textual objects in each of the multiple natural languages in the media-based multilanguage electronic document;
      transform the textual objects directly derived from each of the multiple natural languages in the media-based multilanguage electronic document and the textual objects derived from the identified non-textual objects in each of the multiple natural languages in the media-based multilanguage electronic document into structured data objects in each of the multiple natural languages in the media-based multilanguage electronic document based on configurable criteria;
      generate a dynamic index-oriented object with multiple facets for the structured data objects specific to a business entity, wherein the dynamic index-oriented object is a center facing item in a JavaScript Object Notation for Linked Data (JSON-LD) code of the media-based multilanguage electronic document of the business entity;
      connect the structured data objects to the dynamic index-oriented object by creating linked data nodes from the structured data objects with the dynamic index-oriented object as a core, wherein the created linked data nodes are JSON-LD nodes; and dynamically change the media-based multilanguage electronic document and dynamically optimize the media-based multilanguage electronic document by connecting the dynamic index-oriented object with the linked JSON-LD nodes to corresponding content in each of the multiple natural languages in the media-based multilanguage electronic document.

2. The system of claim 1, wherein the non-textual objects rendered in each of the multiple natural languages in the media-based multilanguage electronic document comprise image objects, audio objects, video objects, animation objects, multimedia objects, and any combination thereof.

3. The system of claim 1, wherein the media categories comprise an image category, an audio category, a video category, an animation category, a multimedia category, and any combination thereof, and wherein the market data used for optimizing the textual objects in the multiple languages comprise geographical data, local data, image data, keyword search data, and any combination thereof.

4. The system of claim 1, wherein the configurable criteria for transforming the textual objects directly derived from each of the multiple natural languages in the media-based multilanguage electronic document and the textual objects derived from the identified non-textual objects in each of the multiple natural languages in the media-based multilanguage electronic document into the structured data objects comprise templates, content directly derived from each of the multiple natural languages in the media-based multilanguage electronic document, content derived from the textual objects derived from the identified non-textual objects in each of the multiple natural languages in the media-based multilanguage electronic document, structured data markup schemas, best practices associated with schemas to suit a plurality of linked data object categories, and any combination thereof.

5. The system of claim 1, wherein the transformation of the textual objects directly derived from each of the multiple natural languages in the media-based multilanguage electronic document and the textual objects derived from the identified non-textual objects in each of the multiple natural languages in the media-based multilanguage electronic document into structured data objects in each of the multiple natural languages in the media-based multilanguage electronic document is an artificial intelligence-based transformation.

6. The system of claim 1, wherein one or more of the computer program instructions defined by the media data optimization engine, when executed by the at least one processor, cause the at least one processor to store the structured data objects in a dynamic index-oriented object database.

7. The system of claim 1, wherein, in response to a search query, one or more of the computer program instructions defined by the media data optimization engine, when executed by the at least one processor, cause the at least one processor to fit one or more of the linked data nodes of the dynamic index-oriented object to the search query.

8. The system of claim 1, wherein the dynamic changes to the media-based multilanguage electronic document are facilitated free of recreation of the structured data objects using the created linked data nodes of the dynamic index-oriented object, and wherein dynamic changes comprise automatic addition of the dynamic index-oriented object with the linked data nodes to the media-based multilanguage electronic document by the media data optimization engine, after creation of the structured data objects for the content of the media-based multilanguage electronic document, in a connected framework formed between the media data optimization engine and the media-based multilanguage electronic document.

9. The system of claim 1, wherein the identifier is a uniform resource locator of the media-based multilanguage electronic document.

10. A method employing a media data optimization engine defining computer program instructions executable by at least one processor, the method comprising:
   accessing a media-based multilanguage electronic document of a business entity using an identifier of the media-based multilanguage electronic document, wherein the media-based multilanguage electronic document is one of a media-based multilanguage website and a webpage of the media-based multilanguage website;
   individually executing below steps in a language that corresponds to each natural language identified in the media-based multilanguage electronic document:
      identifying non-textual objects rendered in each of the multiple natural languages in the media-based multilanguage electronic document;
      categorizing the identified non-textual objects in each of the multiple natural languages in the media-based multilanguage electronic document into media categories;
      analyzing the identified non-textual objects in each of the media categories in each of the multiple natural languages in the media-based multilanguage electronic document based on characteristics of the identified non-textual objects;
      generating transcripts and closed captions in each of the multiple natural languages in the media-based multilanguage electronic document for the identified non-textual objects in the media categories;
      transforming the transcripts and the closed captions of the identified non-textual objects in the media categories into the textual objects in each of the multiple natural languages in the media-based multilanguage electronic document;
      analyzing the textual objects directly derived from each of the multiple natural languages in the media-based multilanguage electronic document and the textual objects derived from the identified non-textual objects in each of the multiple natural languages in the media-based multilanguage electronic document with market data specific to the business entity for optimizing the textual objects directly derived from each of the multiple natural languages in the media-based multilanguage electronic document and the textual objects derived from the identified non-textual objects in each of the multiple natural languages in the media-based multilanguage electronic document;
      transform the textual objects directly derived from each of the multiple natural languages in the media-based multilanguage electronic document and the textual objects derived from the identified non-textual objects in each of the multiple natural languages in the media-based multilanguage electronic document into structured data objects in each of the multiple natural languages in the media-based multilanguage electronic document based on configurable criteria;

generate a dynamic index-oriented object with multiple facets for the structured data objects specific to a business entity, wherein the dynamic index-oriented object is a center facing item in a JavaScript Object Notation for Linked Data (JSON-LD) code of the media-based multilanguage electronic document of the business entity;

connect the structured data objects to the dynamic index-oriented object by creating linked data nodes from the structured data objects with the dynamic index-oriented object as a core, wherein the created linked data nodes are JSON-LD nodes; and dynamically changing the media-based multilanguage electronic document and dynamically optimizing the media-based multilanguage electronic document by connecting the dynamic index-oriented object with the linked JSON-LD nodes to corresponding content in each of the multiple natural languages in the media-based multilanguage electronic document.

11. The method of claim 10, wherein the non-textual objects rendered in each of the multiple natural languages in the media-based multilanguage electronic document comprise image objects, audio objects, video objects, animation objects, multimedia objects, and any combination thereof.

12. The method of claim 10, wherein the media categories comprise an image category, an audio category, a video category, an animation category, a multimedia category, and any combination thereof, and wherein the market data used for optimizing the textual objects in the multiple languages comprise geographical data, local data, image data, keyword search data, and any combination thereof.

13. The method of claim 10, wherein the configurable criteria for transforming the textual objects directly derived from each of the multiple natural languages in the media-based multilanguage electronic document and the textual objects derived from the identified non-textual objects in each of the multiple natural languages in the media-based multilanguage electronic document into the structured data objects comprise templates, content directly derived from each of the multiple natural languages in the media-based multilanguage electronic document, content derived from the textual objects derived from the identified non-textual objects in each of the multiple natural languages in the media-based multilanguage electronic document, structured data markup schemas, best practices associated with schemas to suit a plurality of linked data object categories, and any combination thereof.

14. The method of claim 10, further comprising, in response to a search query, fitting one or more of the linked data nodes of the dynamic index-oriented object to the search query.

15. The method of claim 10, wherein the identifier is a uniform resource locator of the multilanguage electronic document.

16. A non-transitory, computer-readable storage medium having embodied thereon, computer program instructions executable by at least one processor for automatically creating structured data objects for textual objects and non-textual objects rendered in media-based multilanguage electronic document of a business entity and dynamically optimizing the media-based multilanguage electronic document, the computer program instructions when executed by the at least one processor cause the at least one processor to:

access the media-based multilanguage electronic document of the business entity using an identifier of the media-based multilanguage electronic document;

individually execute below steps in a language that corresponds to each natural language identified in the media-based multilanguage electronic document:

identify non-textual objects rendered in each of the multiple natural languages in the media-based multilanguage electronic document, and wherein the non-textual objects comprise image objects, audio objects, video objects, animation objects, multimedia objects, and any combination thereof;

categorize the identified non-textual objects in each of the multiple natural languages in the media-based multilanguage electronic document into media categories;

analyze the identified non-textual objects in each of the media categories in each of the multiple natural languages in the media-based multilanguage electronic document based on characteristics of the identified non-textual objects;

generate transcripts and closed captions in each of the multiple natural languages in the media-based multilanguage electronic document for the identified non-textual objects in the media categories;

transform the transcripts and the closed captions of the identified non-textual objects in the media categories into the textual objects in each of the multiple natural languages in the media-based multilanguage electronic document;

analyze the textual objects directly derived from each of the multiple natural languages in the media-based multilanguage electronic document and the textual objects derived from the identified non-textual objects in each of the multiple natural languages in the media-based multilanguage electronic document with market data specific to the business entity for optimizing the textual objects directly derived from each of the multiple natural languages in the media-based multilanguage electronic document and the textual objects derived from the identified non-textual objects in each of the multiple natural languages in the media-based multilanguage electronic document;

transform the textual objects directly derived from each of the multiple natural languages in the media-based multilanguage electronic document and the textual objects derived from the identified non-textual objects in each of the multiple natural languages in the media-based multilanguage electronic document into structured data objects in each of the multiple natural languages in the media-based multilanguage electronic document based on configurable criteria;

generate a dynamic index-oriented object with multiple facets for the structured data objects specific to a business entity, wherein the dynamic index-oriented object is a center facing item in a JavaScript Object Notation for Linked Data (JSON-LD) code of the media-based multilanguage electronic document of the business entity;

connect the structured data objects to the dynamic index-oriented object by creating linked data nodes from the structured data objects with the dynamic index-oriented object as a core, wherein the created linked data nodes are JSON-LD nodes; and dynamically change the media-based multilanguage electronic document and dynamically optimize the media-based multilanguage electronic document by connecting the dynamic index-oriented object with the linked JSON-LD nodes to corresponding content in each of the multiple natural languages in the media-based multilanguage electronic document.

17. The non-transitory, computer-readable storage medium of claim 16, wherein the configurable criteria for transforming the textual objects directly derived from each of the multiple natural languages in the media-based multilanguage electronic document and the textual objects derived from the identified non-textual objects in each of the multiple natural languages in the media-based multilanguage electronic document into the structured data objects comprise templates, content directly derived from each of the multiple natural languages in the media-based multilanguage electronic document, content derived from the textual objects derived from the identified non-textual objects in each of the multiple natural languages in the media-based multilanguage electronic document, structured data markup schemas, best practices associated with schemas to suit a plurality of linked data object categories, and any combination thereof.

18. The non-transitory, computer-readable storage medium of claim 16, wherein, in response to a search query, one or more of the computer program instructions when executed by the at least one processor, cause the at least one processor to fit one or more of the linked data nodes of the dynamic index-oriented object to the search query.

19. The non-transitory, computer-readable storage medium of claim 16, wherein the media categories comprise an image category, an audio category, a video category, an animation category, a multimedia category, and any combination thereof, and wherein the market data for optimizing the textual objects in the multiple languages comprise geographical data, local data, image data, keyword search data, and any combination thereof.

* * * * *